US006104812A

United States Patent [19]
Koltai et al.

[11] Patent Number: 6,104,812
[45] Date of Patent: Aug. 15, 2000

[54] ANTI-COUNTERFEITING METHOD AND APPARATUS USING DIGITAL SCREENING

[75] Inventors: Ferenc Koltai, Budapest; László Baros, Mogyoród; Bence Ádám; Ferenc Takács, both of Budapest, all of Hungary

[73] Assignee: Juratrade, Limited, Budapest, Hungary

[21] Appl. No.: 09/005,529

[22] Filed: Jan. 12, 1998

[51] Int. Cl.[7] .............................. G09C 5/00; B42D 15/00; H04L 9/00

[52] U.S. Cl. .............................. 380/51; 380/54; 380/205; 713/176; 283/113; 382/135

[58] Field of Search .................................. 380/51, 54, 55, 380/10, 200, 205, 243, 252; 382/100, 115, 135, 232; 283/17, 93, 113; 713/176

[56] References Cited

U.S. PATENT DOCUMENTS

| | | |
|---|---|---|
| 1,002,600 | 9/1911 | Morris et al. . |
| 3,937,565 | 2/1976 | Alasia . |
| 4,198,147 | 4/1980 | Alasia . |
| 4,341,404 | 7/1982 | Mowry, Jr. et al. . |
| 4,914,700 | 4/1990 | Alasia . |
| 4,949,381 | 8/1990 | Pastor ........................................ 380/51 |
| 5,027,401 | 6/1991 | Soltesz . |
| 5,178,418 | 1/1993 | Merry et al. . |
| 5,303,370 | 4/1994 | Brosh et al. . |
| 5,337,361 | 8/1994 | Wang et al. .............................. 380/51 |
| 5,340,159 | 8/1994 | Mowry, Jr. . |
| 5,396,559 | 3/1995 | McGrew . |
| 5,426,700 | 6/1995 | Berson ................................... 713/176 |

(List continued on next page.)

FOREIGN PATENT DOCUMENTS

| | | | |
|---|---|---|---|
| 0 493 053 | 7/1992 | European Pat. Off. ....... | G06K 11/12 |
| 0581317 A2 | 2/1994 | European Pat. Off. ......... | G07D 7/00 |
| 0 705 022 | 4/1996 | European Pat. Off. ......... | H04N 1/32 |
| 0 777 197 | 6/1997 | European Pat. Off. ......... | G06T 1/00 |
| WO 97/20298 | 8/1996 | WIPO .............................. | G09C 5/00 |
| 0 766 468 | 4/1997 | WIPO .............................. | H04N 7/08 |
| WO 96/26494 | 6/1997 | WIPO .............................. | G06F 17/30 |
| WO 97/43736 | 11/1997 | WIPO . | |

OTHER PUBLICATIONS

Official German Language Communication, German Patent and Trademark Office, Jun. 29, 1999, 5 pgs.

English Language Translation of Official Communication from the German Patent and Trademark Office, Jun. 29, 1999, 4 pgs.

Article, "Look, It's Not There" by Jian Zhao, *Byte,* vol. 22, No. 1, Jan., 1997, pp. 7/8, 10, 12.

PCT International Search Report dated May 3, 1999 for International Application No. PCT/HU 99/00002.

Brochure of Jura Security Printing, Jura Trade Ltd., Budapest Hungary, with sample image.

"Computer–Aided Security Design System for Pre–Press Operations: The Jura Security Printing (JSP) Design System", 13th International Security Printers Conference–Prague, Czech Republic, May 12–14, 1994 pp. 1–10.

M. Schreiber, Scrambled images in Parrot test printing; USPS may use device, *Linn's Stamp News,* vol. 69, Issue 3533, Jul. 22, 1996.

*Primary Examiner*—Pinchus M. Laufer
*Attorney, Agent, or Firm*—Ratner & Prestia

[57] ABSTRACT

An apparatus and process for hiding the secondary image within the primary image and generating a high quality hard copy of the unified elemental image of a variety of media. The process comprises the steps of rasterizing the first image into an first elemental image and rasterizing the second image, compensated with its own inverse, into an second elemental image. The first elemental image and the second elemental image are merged into a unified elemental image based on a predetermined decoding and compensating principle, resulting in the second elemental image being hidden within the first elemental image. An output image is created based on the unified elemental image where the primary image is visible to an un-aided eye while the secondary image is hidden from the un-aided eye.

23 Claims, 19 Drawing Sheets

U.S. PATENT DOCUMENTS

| | | | |
|---|---|---|---|
| 5,537,223 | 7/1996 | Curry | 713/176 |
| 5,568,556 | 10/1996 | Conley | 380/54 |
| 5,617,119 | 4/1997 | Briggs et al. | 380/54 X |
| 5,671,277 | 9/1997 | Ikenoue et al. | |
| 5,673,121 | 9/1997 | Wang | 358/456 |
| 5,708,717 | 1/1998 | Alasia | |
| 5,710,834 | 1/1998 | Rhoads | 382/232 |
| 5,734,752 | 3/1998 | Knox | 382/212 |
| 5,790,703 | 8/1998 | Wang | 382/212 |
| 5,822,660 | 10/1998 | Wen | 380/51 X |
| 5,825,892 | 10/1998 | Braudaway et al. | 380/51 |
| 5,859,920 | 1/1999 | Daly et al. | 382/115 |
| 5,905,819 | 5/1999 | Daly | 382/284 |
| 5,974,458 | 10/1999 | Adams | 713/200 |
| 5,995,638 | 11/1999 | Amidror et al. | 382/100 |
| 6,039,357 | 3/2000 | Kendrick | 283/93 |
| 6,044,156 | 3/2000 | Honsinger et al. | 380/54 |

Different Basic Screening Technologies

Continuous Tone

Round screen

Stochastic screen

Line screen

Elliptical screen

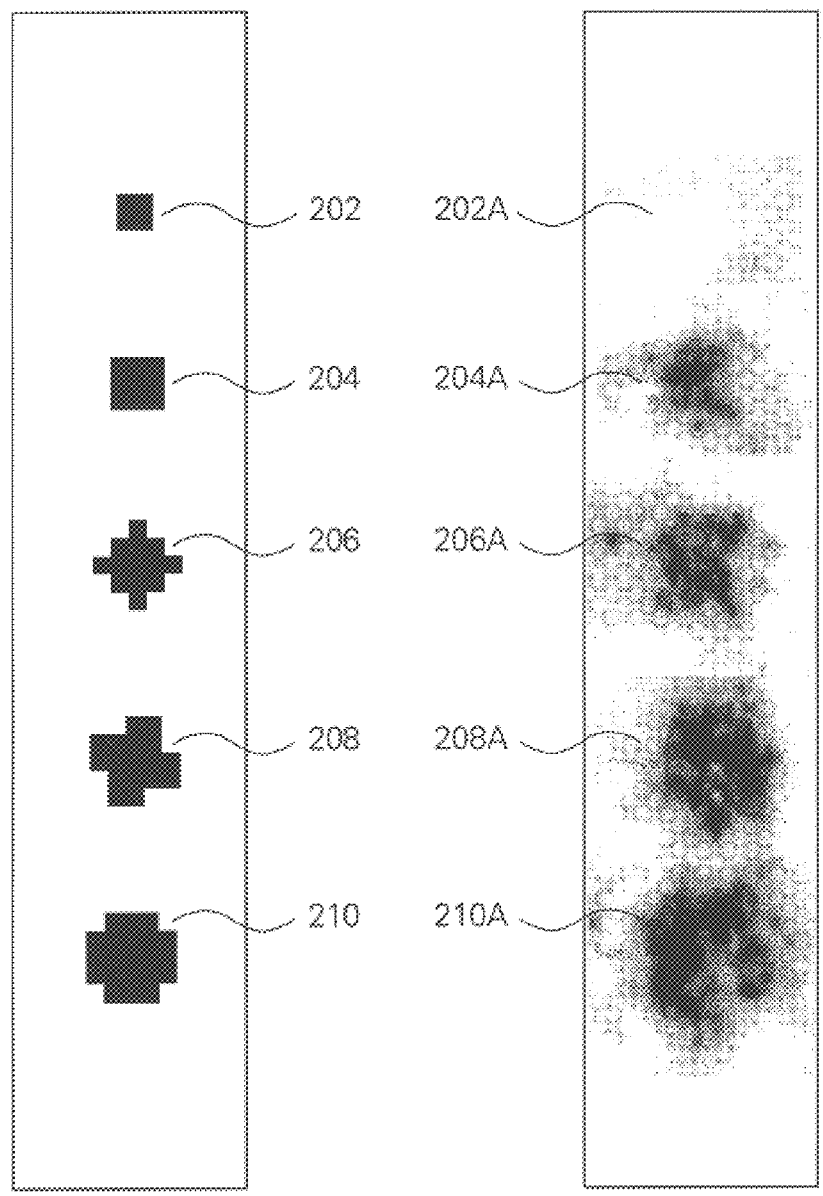

Definitions of Image-builder Elements
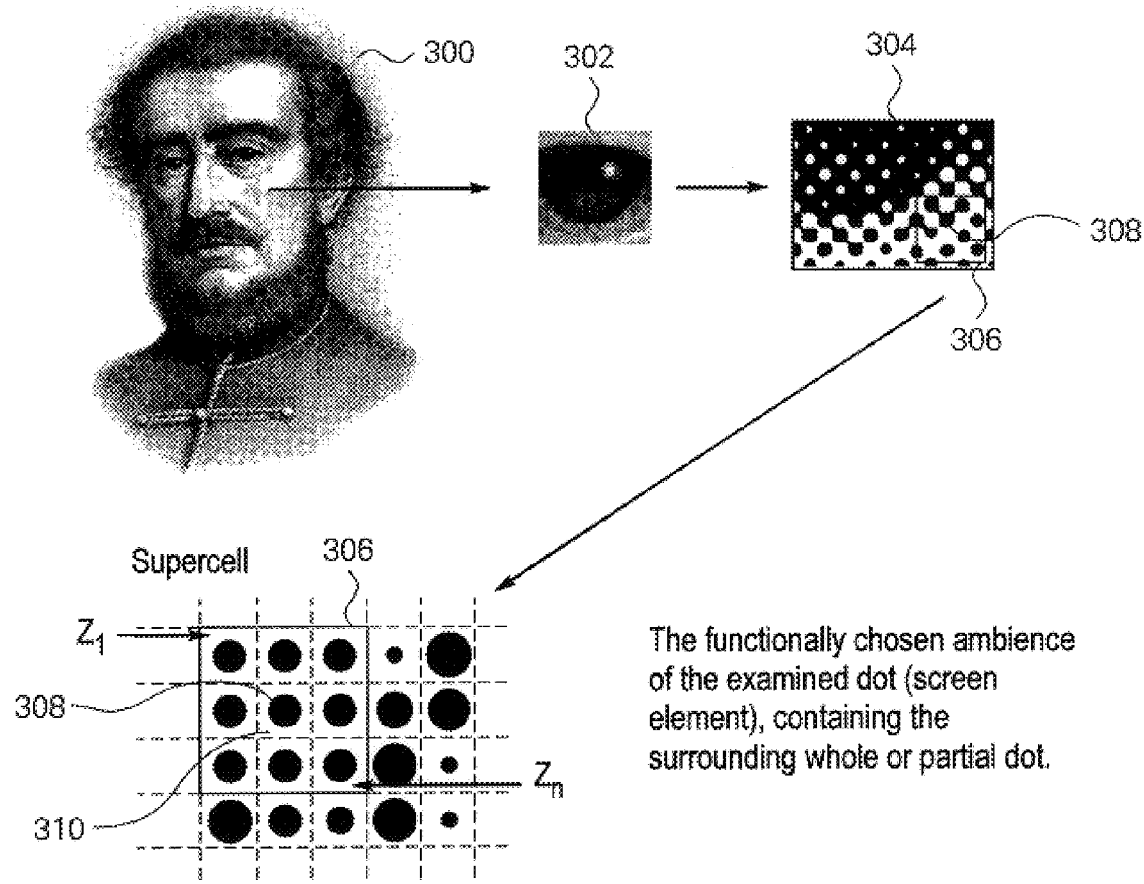
The functionally chosen ambience of the examined dot (screen element), containing the surrounding whole or partial dot.
Supercell dot area percentage ($Z_\Sigma$):
$$Z_\Sigma = \frac{\sum Z_1; \ldots Z_n;}{n}$$
FIG. 3
One screen dot and its cell
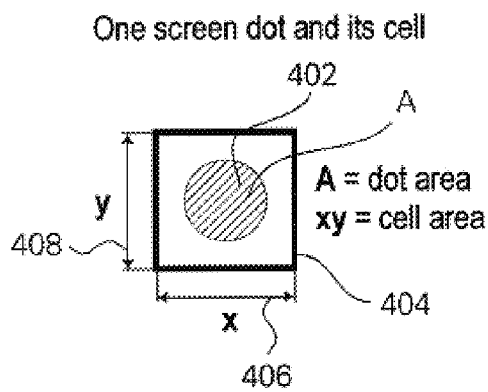
FIG. 4A
Value (Z): 0 – 100%
        
75%      50%      25%
FIG. 4B    FIG. 4C    FIG. 4D
Dot area percentage (Z):
$$Z = \frac{A}{xy} \, [\%]$$

Compensation in a Single Cell

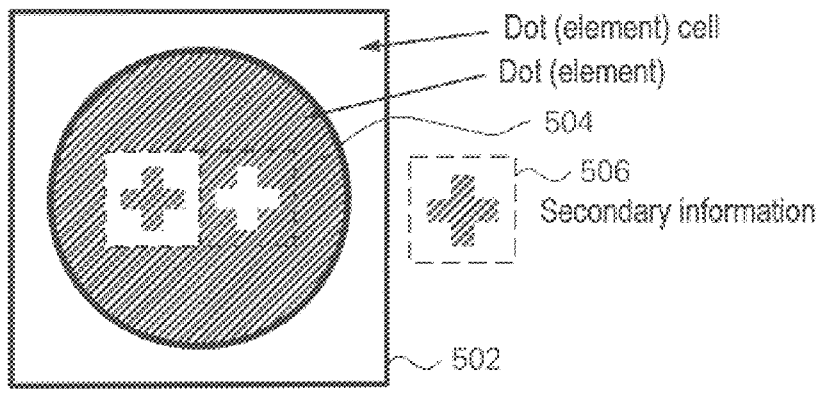

To hiding the secondary information implemented into the screen dot (element) that we have to add the invertion of the information too.
In case of a B&W graphical information its negative, in case of a color information its complementer color.

FIG. 5

If the Digital Information Carrier is: DENSITY

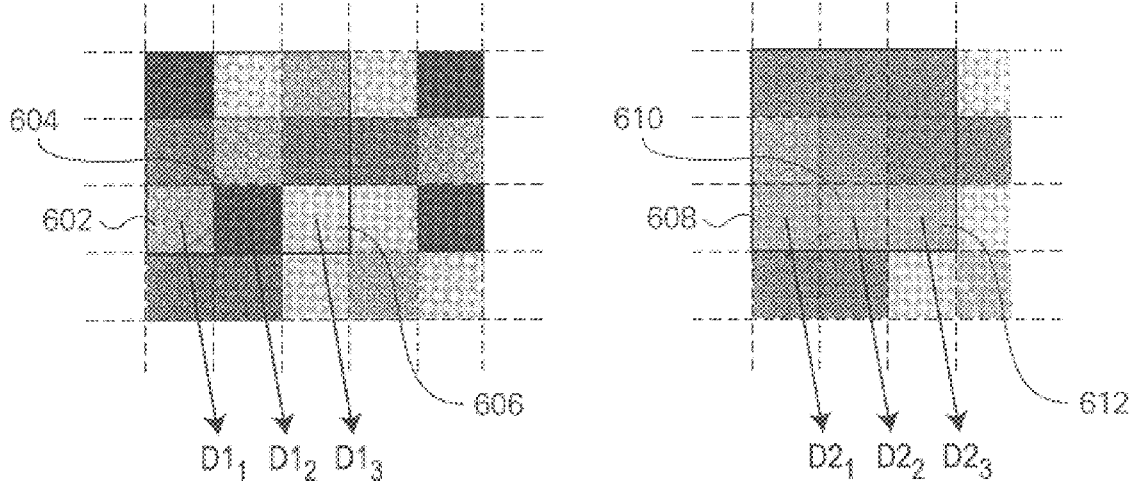

$D1_1 \neq D2_1; D1_2 \neq D2_2; D1_3 \neq D2_3$
To the compensation the average density of supercell must be the same.

FIG. 6

If the Digital Information Carrier is: FORM AND SHAPE
Equalized dot area percentage:

Equalized supercell dot area percentage:

If the Digital Information Carrier is: ANGLE

Requirement of invisibility:
$Z_A = Z_B$ (or $Z_{\Sigma 1} = Z_{\Sigma 2}$)
Information carrier: $\alpha$

If the Digital Information Carrier is: POSITION

Requirement of invisibility:
$Z_{\Sigma 1} = Z_{\Sigma 2}$
Information carrier: the position difference between the normal and the distorted screen

If the Digital Information Carrier is: SIZE

Requirement of invisibility:
$Z_{\Sigma 1} = Z_{\Sigma 2}$
Information carrier: $Z_A \neq Z_B$

If the Digital Information Carrier is: FREQUENCY

Supercell dot area percentage is same, information carrier is the difference of frequency Double Line Thickness Modulation Line Thickness Modulation II Emboss Line Raster Relief Double Relief Emboss Round Raster Cross Raster Latent Round Raster Oval Raster Cross Line Raster Slicing the output image.
The width of the slice depends on the decoder lens' frequency:

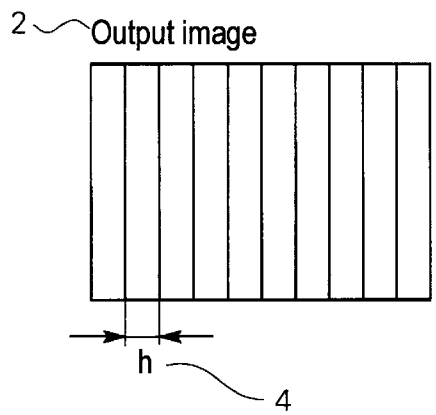

2 — Output image

The frequency of
d - 7x = 177 line/",
d - 7  = 152.5 line/",
d - 6  = 134 line/",
d - 9  = 69 line/",
...

If the 'x2' option is on, it means that the frequency will duplicate.

Inside of every slice the process is the same.

FIG. 20
(Prior Art)

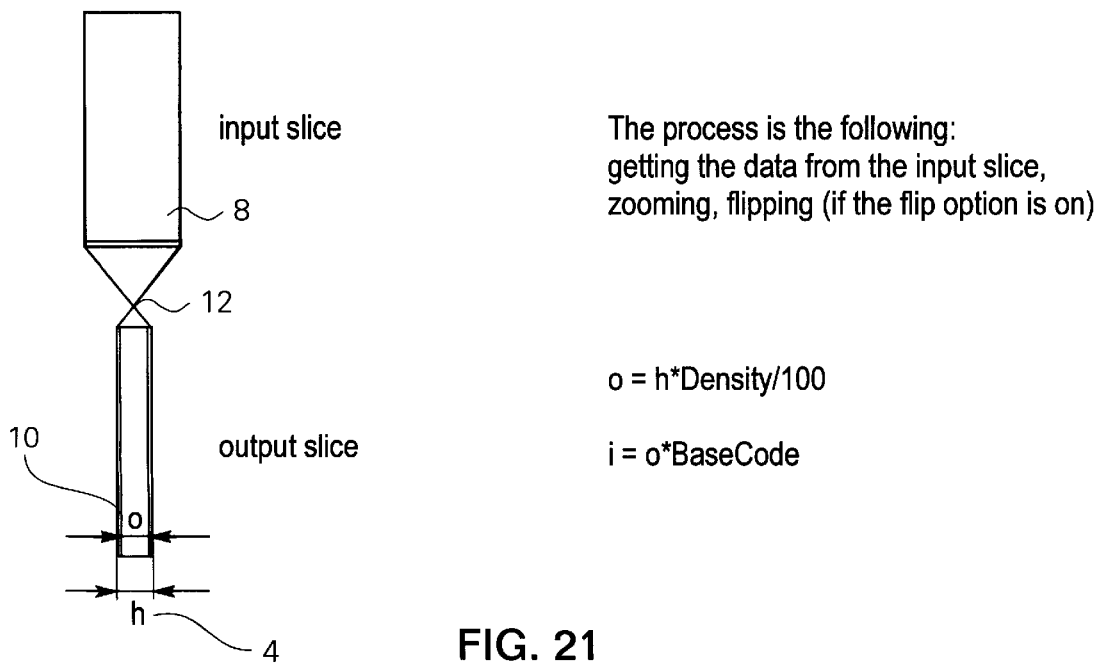

input slice

The process is the following:
getting the data from the input slice,
zooming, flipping (if the flip option is on)

output slice $o = h*Density/100$ $i = o*BaseCode$

FIG. 21
(Prior Art)

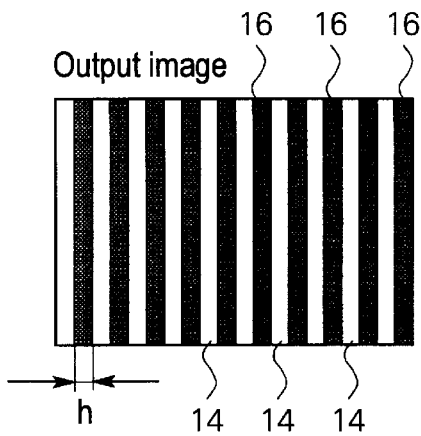

Output image

The method is similar to that of the One Phase but the width of the slice is half of the One Phase. Every odd slice input is 'source one' file, every even slice is 'source two' file.

The process inside slice is the same to that of the One Phase

FIG. 22
(Prior Art)

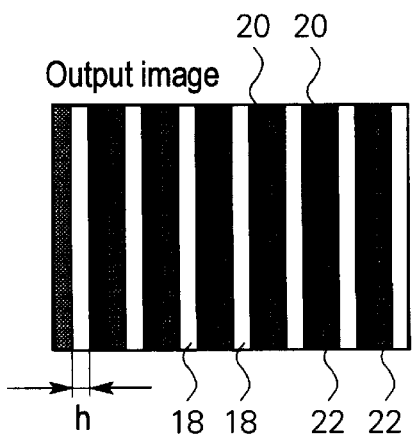

Output image

The method is similar to that of the Two Phase but the width of the slice is third of the One Phase. Every third slice input is the same.

The process of the inside of the slice is the same like that of the One Phase

FIG. 23
(Prior Art)

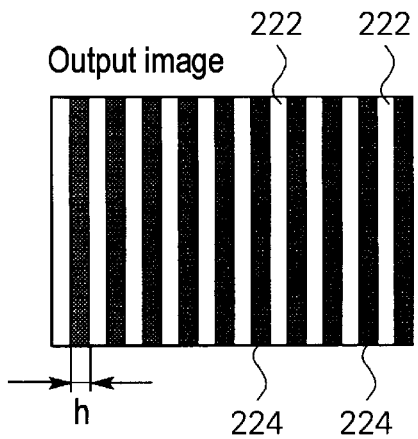

The method is similar to that of the One Phase SI, but every second slice input is the complement of the input slice.

The complement means for example when the input is black, the complement is white.
If the input is red, the complement is cyan...

The process inside of the slice is the same like that of the One Phase SI.

The Hidden SI is the same, but the output background is a picture instead of white. The first step is to copy the visible image to the output image.
After this the method is the same like in the case of Indicia Tint.
The density parameter controls the visibility of the image.

The SI raster is similar to that of the Indicia Tint, but the density controlled by the second input file.
If the value from the second input file is dark, the density will be high.

FIG. 24
(Prior Art)

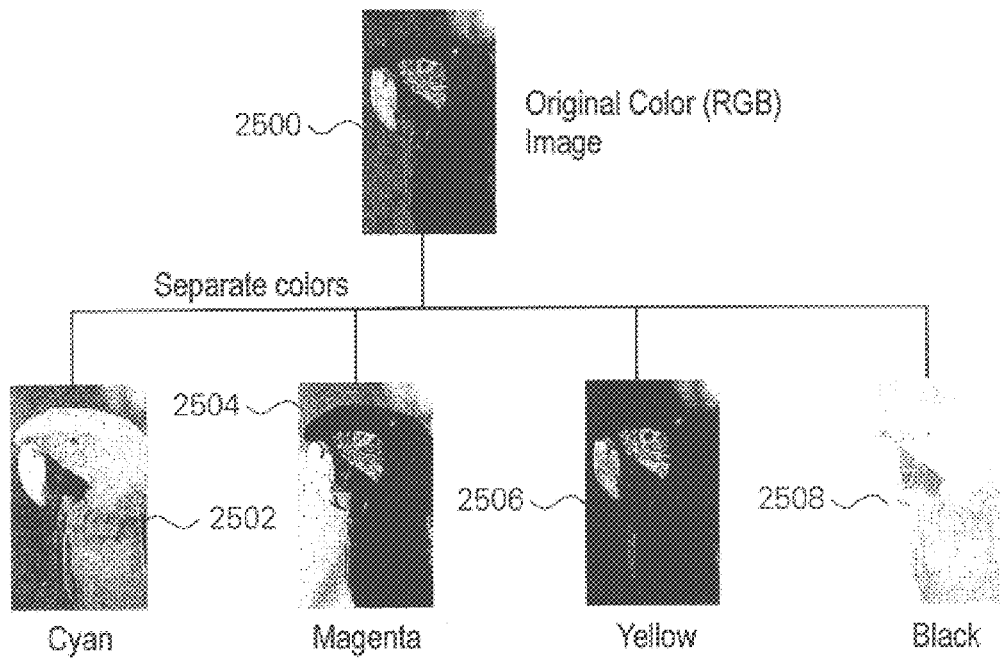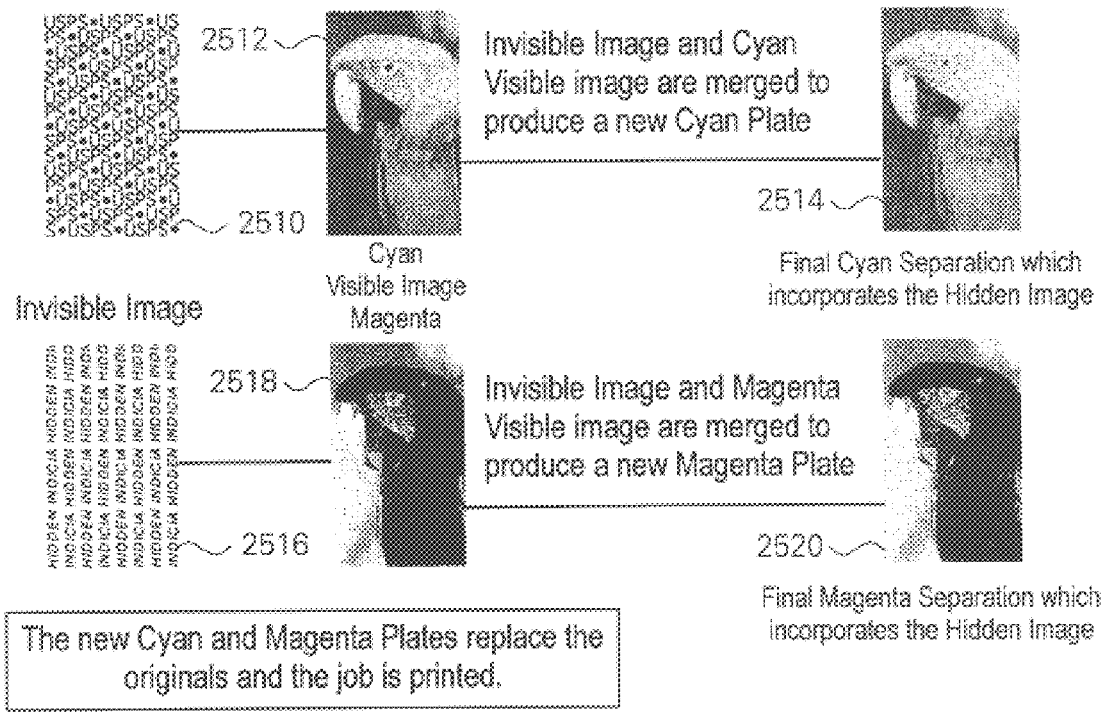
FIG. 25

ANTI-COUNTERFEITING METHOD AND APPARATUS USING DIGITAL SCREENING

FIELD OF THE INVENTION

This invention generally relates to a method and apparatus for producing counterfeit-deterring hidden indicia images, typically in a printed or non printed (electronic) form, and more particularly to a digital screening method and apparatus using encoded digital screens implemented by a software program on a computer system. This method and apparatus are capable of combining a primary image with a secondary image so the secondary image is visible only when the original document is viewed through a special decoding device.

BACKGROUND OF THE INVENTION

To prevent unauthorized duplication or alteration of documents, frequently there are special indicia or a background pattern provided for sheet materials such as tickets, checks, currency, and the like. The indicia or background pattern is imposed upon the sheet material usually by some type of printing process such as offset printing, lithography, letterpress or other like mechanical systems, by a variety of photographic methods, by xeroprinting, and a host of other methods. The pattern or indicia may be produced with ordinary inks, from special inks which may be magnetic, fluorescent, or the like, from powders which may be baked on, from light sensitive materials such as silver salts or azo dyes, and the like. Most of these patterns placed on sheet materials depend upon complexity and resolution to avoid ready duplication. Consequently, they add an increment of cost to the sheet material without being fully effective in many instances in providing the desired protection from unauthorized duplication or alteration.

Various methods of counterfeit-deterrent strategies have been suggested including Moire-inducing line structures, variable-sized dot patterns, secondary images, see-throughs, bar-codes, diffraction based holograms and more. However, none of these methods employs a reliable, readable secondary image in a primary image without the former having influence on the quality of the latter, and the provision of additional security benefits derived therefrom.

Conventional systems for coding and decoding indicia on printed matter produce a parallax panoramagram image or a scrambled image. Such a conventional system is described in U.S. Pat. No. 3,937,565, to A. Alasia issued Feb. 10, 1976, now expired. The indicia were produced photographically using a lenticular line screen (i.e. a lenticular screen) with a known spatial lens density (e.g. 69 lines per inch).

Photographic, or analog, production of coded indicia images has the drawback of requiring a specialized camera. Also, the analog images are limited in their versatility in that an area of counterfeit deterrent indicia an generally noticeable when surrounded by foreground (secondary) images. Also, it is difficult to combine several secondary images, with potentially different parameters, due to the inability to effectively re-expose film segments in generating the counterfeit determent, photographic image.

Various reproduction technologies, such as printed or unprinted (electronic) technology, used for distribution of visual information, are based on screening of the image. In these technologies, the picture is divided into a set of systematically coordinated elementary dots, pixels, etc., the size of which are below the resolution of the human eye. Referring to FIGS. 1A–1F, examples of various printing screens of the prior art are shown which may be used to produce image 100 having different shades. In FIG. 1A, a portion 102 of image 100 is enlarged to show the effect of the different screening techniques as shown in FIGS. 1B–1F. These screens make reproduction possible, but at the same time decrease reproduction quality of the image when compared to the original image, rendering the reproduced image "noisy".

Furthermore, imperfections of different systems and media, used for reproduction, such as ink, print media (e.g., paper, plastic, etc.), electron-beams, display pixels, etc., neither allow the creation nor the grouping of the elementary information-holders, such as dots, pixels, etc., in full accordance with the clear theoretical requirements, but only with fewer or greater distortion. This further increases the "noise" in the resultant image.

In the case of four color reproduction, either electronic or printed, there is also a decrease in the quality of the picture due to the millions of color-shades of the original image that must be reproduced by using three colors only, represented by optically imperfect inks.

As shown in FIGS. 2A and 2B, the above factors, and a variety of other factors, produce the result that none of the elementary dots 202–210 have theoretically perfect geometrical form, position and size after printing 202A–210A.

Screening and coloristic questions are crucial points of multicolor reproduction technology. To solve the coloristic problems, two international standards have been established. These are the Red-Green-Blue (RGB) and Cyan-Magenta-Yellow-Black (CMYK) standards which are used universally. Six color reproduction is also used in limited applications.

Using a conventional 80 line/cm printing screen, four different ink-dots may be printed in an area of 0.125 mm×0.125 mm (0.005 in.×0.005 in.) in exact size, geometric form, position and thickness. This increase in resolution exacerbates the problem, because decreasing the size of the elementary dots or pixels (i.e. increasing the resolution of the screen) decreases the "noise" of the image, but undesirable influences of the imperfections of the applied materials and processes increases. The closer the resolution of the screen to the resolution of the reproduction process (i.e. to the limits of printability), the more technological imperfections undesirably impact the produced image.

In order to reduce the undesirable consequences of these imperfections, they must be taken into consideration in advance during the reproduction process.

For this reason, the original image may be digitized or scanned, and divided into elementary pixels in a continuous tonal mode, by using an appropriate screen. The size of all pixels are the same, although the density of pixels may be different, according to the actual image.

Once the theoretical density has been modified accordingly, the pixels may be converted from a continuous mode into a bit-map mode. In the bit map mode, the size of the dots are different but the overall density of the dots are equal. This is preferred because, during the printing (with the exception of the gravure printing), the thickness or printable density of the printable ink fill is the same overall. As a result, a continuous tone pixel having the maximum area of 0.125×0.125 mm, (0.005 in×0.005 in, using the 80 line/cm screen) and a density of 25%, for example, is replaced with a screen dot having an optical equivalence, covering only 25% of the same area, but having an equivalent maximum density.

Some conventional reproduction processes and devices use continuous tone pixels, such as etched rotogravure, electronic display, and some digital printers. Other reproduction processes use screen-dots, like offset printing, and most digital printing processes. Further processes use a combination of both continuous tone and screen dots, for example, such as, intaglio printing, and gravured rotogravure printing.

The process of conversion of continuous tone mode into a bitmap mode is a complex procedure and has a primary importance in screening technology. This is because the theoretical density of the continuous tone elementary pixels, received after scanning, is modified in advance according to the technological imperfections of the further reproduction processes.

For example, in offset print reproduction the technological imperfections may include:

1. Distortions in form and size of the converted dots through the further reproduction processes, such as:
   converting the continuous tone pixels into screen dots
   creating of dots in the image sets in which moire effects may occur
   film exposure and processing,
   copying on a printing plate,
   processing of the printing plate, and
   the printing process.
2. Optical imperfections of the applied inks.

Most of the distortions of elementary screen-dots occur in the printing process. As a result, unpredictable effects may occur, such as:

inhomogeneities of the paper surface, the rubber blanket and the printing ink, distortions resulting from the impression power in the print zone, the mechanical inaccuracies in the printing apparatus, and deformations in the printing paper.

Different printing technologies have different imperfections, characteristic to each particular printing process. Therefore, to compensate for these different imperfections, different screening technologies and screens have been developed.

For digital printing the screening has an even greater importance. There are different versions of digital printing technologies, such as the laser, inkjet, dye sublimation, magnetographic, electrostatic, etc. Thus, as these processes are still emerging, they have significantly more imperfections than traditional printing processes.

The correction of technological imperfections is even more complicated in security printing. The smaller or thinner the printed element is, the greater the relative distortion in the printing process, and the more difficult compensation of these distortions.

SUMMARY OF THE INVENTION

In view of the shortcomings of the prior art, it is an object of the present invention to increase the security and anti-counterfeiting capabilities of a variety of media, such as tickets, passports, licenses, currency, postal media, etc., by hiding a secondary image within a primary image so that the secondary image is visible to a viewer only when a decoder is used.

The process comprises the steps of rasterizing the first image into an first elemental image and rasterizing the second image, which is compensated for by an inverse of itself, into an second elemental image. The first elemental image and the second elemental image are then merged into a unified elemental image based on a predetermined decoding and compensating principle, resulting in the second elemental image being hidden within the first elemental image. An output image is created based on the unified elemental image where the primary image is visible to an unaided eye while the secondary image is hidden from the un-aided eye.

The present invention further relates to an apparatus for implementing the method for hiding the secondary image within the primary image and generating a high quality hard and/or soft copy of the unified elemental image for a variety of media.

The present invention further relates to a software method and apparatus for digitally incorporating secondary images into a primary image. The secondary image—in digitized form—can be measured for decoding by a variety of optical and electronic decoders selected by the user. Different degrees of hiding may also be selected wherein the secondary image is rotated or layered with respect to other secondary images.

The primary image is then rasterized, or divided up into a series of elements. Generally, when hard copy images are printed, the image is made up of a series of "printers dots" which vary in density according to the colors found in the various component parts of the image. The software method and apparatus of the present invention makes it possible to have a rasterized primary image, where the elements of the image (e.g. dots, pixels, etc.) are modified in order to contain the elements of the secondary image and, at the same time, distorted in order to compensate for both the modifications and expected imperfections of the reproduction technology used. The resulting combined image appears to the unaided eye like the original primary image. However, since the component rasterized elements are formed in order to approach the coded pattern of the secondary image, a decoder will reveal the underlying secondary image. Due to the high printing resolution needed for such complex lines, attempts to copy the printed image by electromechanical means, or otherwise, are most often unsuccessful in reproducing the underlying secondary image.

As a result of this digital approach, several different secondary images can be combined into an overall secondary image, which can then be reformed into the rasterized primary image. Each individual secondary image might be oriented at any angle and hidden to a different degree. Alternatively, the gray scale primary image may be divided up into primary component printing colors (e.g. cyan, magenta, yellow, and black (CMYK); red, green, blue, (RGB) or any other color separation system). Single color bitmap formats may also be used for certain applications. One or more secondary images could then be individually reformed into each component color. Upon rejoining the colors to form the final primary image, the decoder will reveal the different secondary images hidden in the different color segments. It is also possible to hide one secondary image within one or more color separations. In this case, the secondary image will be readable through a decoder only upon recombining all color segments in which the secondary information was hidden.

As needed, the primary image may simply consist of a solid color tint or a textured background which would contain hidden secondary images when viewed through the proper decoder. Such solid, tinted areas might frequently be found on checks, currency, tickets, etc.

Other useful applications may include the secondary encoding of a person's personal data (e.g., signature, blood type, medical history, etc.) within a primary image consisting of that person's photograph. Such a technique would make it virtually impossible to produce fake ID's or driver's licenses through the common technique of replacing an existing picture with a false one. Other vital information besides the person's data (e.g. height, weight, identification number, etc.) may also be included in the secondary image for encoding into the primary image.

Still other useful applications may include, for example, the following: credit cards, passports, photo-identification cards, currency, special event tickets, stocks and bond certificates, bank and travelers checks, anti-counterfeiting labels (e.g. for designer clothes, drugs, liquors, video tapes, audio CD's, cosmetics, machine parts, and pharmaceuticals), tax and postage stamps, birth certificates, vehicle registration cards, land deed titles, and visas.

Thus, an objective of the present invention is to provide a counterfeit-deterrent method and apparatus, as implemented by a software program on a computer system, for producing hidden indicia images, typically in a printed form. The hidden image can then be decoded and viewed through a special decoder which is matched to the software coding process parameters.

A further objective of the present invention is to provide a counterfeit deterrent method and apparatus, as implemented by a software program on a computer system, wherein a primary image is rasterized, and the secondary image is broken up into corresponding elemental units, and the rasterized primary image is reconstructed according to the pattern of the hidden secondary image.

Yet a further objective of the present invention is to provide a counterfeit-deterrent method and apparatus, as implemented by a software program on a computer system, wherein the primary image is converted into a gray scale image for incorporation of a secondary image.

Still another objective of the present invention is to provide a counterfeit-deterrent method and apparatus, as implemented by a software program on a computer system, wherein the gray scale primary image is further separated out into its component color parts for incorporation of secondary images into each component color part, with the parts being recombined to form the final encoded unified image.

A further objective of the present invention is to provide a counterfeit deterrent method and apparatus, as implemented by a software program on a computer system, in which the hidden image is only readable digitally using a software based filter. In this case the secondary information may be encoded with software, and the reading device may also be based in software. In addition, the encoding and decoding software may be user programmable.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

The invention is best understood from the following detailed description when read in connection with the accompanying drawings. It is emphasized that, according to common practice, the various features of the drawing are not to scale. On the contrary, the dimensions of the various features are arbitrarily expanded or reduced for clarity. Included in the drawing are the following Figures:

FIGS. 2A and 2B show distortion of elemental portions of an image during the printing process;

FIG. 3 shows definitions of image elements according to the present invention;

FIGS. 4A–4D show the way different shades can be represented by varying the percentage of the screen dot with respect to the screen-cell area;

FIG. 5 shows an example of hiding information within an image by compensation;

FIG. 6 shows the way hidden information can be added to the image by modification of the density of the Continuous Tone pixels, without modifying the average density of the supercell;

FIG. 20 shows a prior art method of segmenting an image;

FIG. 21 shows flipping the image segments of FIG. 20 to create a single phase scrambled image;

FIGS. 22 and 23 show a prior art multi-phase application of the scrambled method shown in FIG. 21;

FIG. 24 is an example of a scrambled image of FIG. 21 in combination with an embodiment of the present invention; and FIG. 25 is another example of a scrambled image in combination with a hidden image of the present invention.

DETAILED DESCRIPTION OF THE INVENTION

Figure 1A:
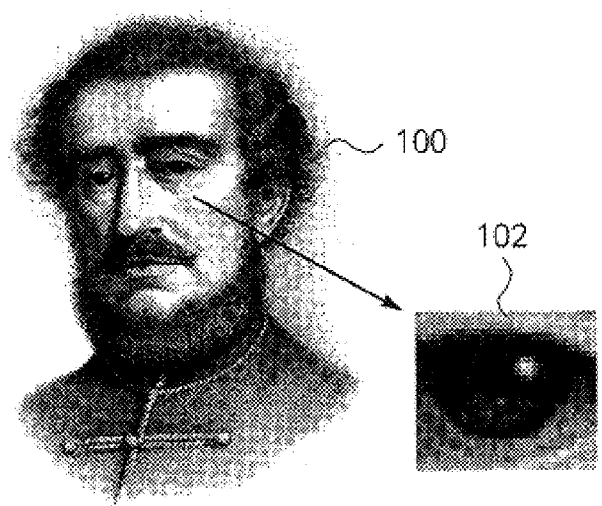
FIGS. 1A–1F show commonly used printing screens to represent images of different shades or colors in the printing process.
Figure 1B:
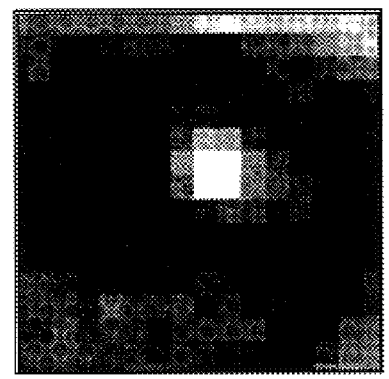
Figure 1C:
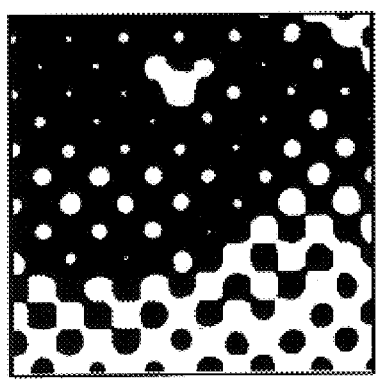
Figure 1D:
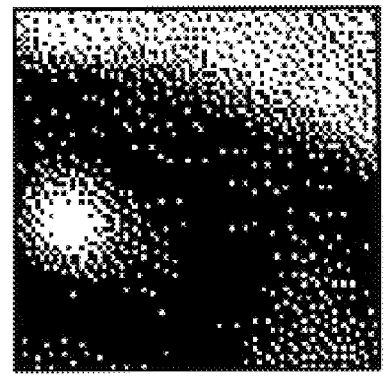
Figure 1E:
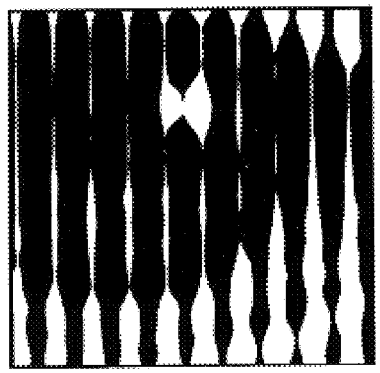
Figure 1F:
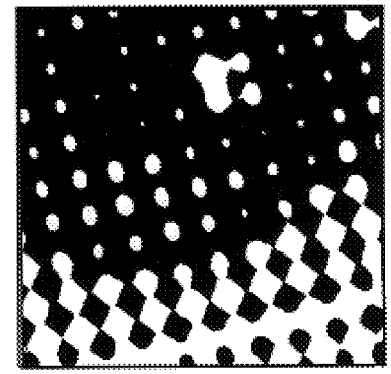

The hidden image process involves rasterizing, or dividing up into elements, such as dots, lines or pixels (elementary data holders), a primary or visible image. With a digital compensating procedure we reform, distort, modify, etc. these elements in order to implement the secondary information, making the secondary image invisible to the un-aided eye with respect to the primary image.

For decoding the implemented information an adequate decoder device is necessary that is able to select the secondary information.

Compensation of the modifications occurs by implementation of the secondary image, when size of distortions caused by technological imperfections are far below the sizes of the modification, required for compensation.

In this case, it is possible to modify the dots of the primary image in order to implement the secondary image and to compensate for them in order to make the secondary image invisible within the same dot-cell. By using a traditional screen of 80 line/cm for example, this is a theoretical square of 0.125×0.125 mm (0.005 in ×0.005 in), called a "single cell". That means, that modification and compensation can be made within one single cell, on only one and the same screen-dot. As the size of undesirable printing distortions are negligible in comparison with the size of conscious modification and compensation portion of the screen dot, the hidden image effect will dominate. This is possible by using high-resolution reproduction processes.

Referring to FIG. 4A, an additional example of how shading of an image may be represented is shown. In FIG. 4A dot 402 is shown within cell 404. The area of cell 404 is represented by the product of width "x" 406 and height "y" 408. The ratio of the area of dot 402 "A" to the area of cell 404 is represented by the following equation:

$$Z=A/(xy)\%, \text{ where } Z \text{ is in the range of 0–100\%.} \quad \text{Equation (1)}$$

FIGS. 4B–4D show various ratios of dot 402 to cell 404. Although cell 404 is shown as a rectangular shape in FIG. 4A, cell 404 may be any desired shape, such as a square, circle, ellipse, trapezoid, etc.

Referring to FIG. 5 an example shown where within a screen dot 504 area we add secondary information 506 and it is compensated for by its inverse beneath the visibility zone of the human eye.

When the size of undesirable printing distortions is near to the size of modification and compensation portion of the screen-dots, the hidden effect decreases and the effect of undesirable printing distortions increases. In order to keep the hidden effect, more screen-dots must be drawn into the compensation, from the neighboring single cells. Groups of signal cells, drawn into the compensation of one modified screen-dot is called as "super cell" (see FIG. 3).

Referring to FIG. 3, an example of a supercell is shown. In FIG. 3, supercell 306 represents determined using the following equation:

$$Z_\Sigma = \Sigma(Z1 \ldots Zn)/n\% \quad \text{Equation (2)}$$

where "n" is the number of cells in supercell 306. The supercell is not necessarily a square, it can be of various shapes, such as a circle, ellipse, rectangle, etc. The functionally chosen ambience of the examined dot (screen element) containing the surrounding whole or partial dot, is within the border of the supercell.

In an exemplary embodiment of the present invention, the reproduction of images is optimized through, for example:

- modification of elementary dots in advance, according to all distortions and deformations, which occur in the further processes of image reproduction,
- calculation, creation and application of the optimum form of the elementary dots, such as elliptic, rhomboid, oval, random, etc., according to the reproduction processes actually applied,
- definition of the correct angle and position of dots in order to avoid moire-effects and reach the highest quality with minimum "noise" in the image.

In order to create different security features for security printing it has been determined, that by using digital screening technologies, not only are technological imperfections of different reproduction processes compensated for, but deliberate distortions and modifications may be included within the resultant image.

In the exemplary embodiment of the present invention, the elementary dots of the primary image are identified as digital information carriers into which additional information may be encoded to hide a secondary image within the primary image. By controlling the process with an appropriate screening technology, distortions resulting from the implementation of the secondary image can be compensated for and made non-visible to the un-aided human eye, although still visible through an appropriate decoding device. The decoding device may be, for example an optical filter, or an electronic decoder The decoder may compensate for one or many encoding effects attributed to the image, such as magnification, reduction, reversal, and prismatic effects. The decoder may also optically filter the image using periodic and/or random filtering patterns based on the encoding method used to encode the image. The optical filtering of the image may also be based on one or many different geometric forms, such as circles, semi-circles, rectangles, triangles, etc.

The electronic decoder may be implemented in hardware, software or a combination thereof further providing programmable capability. The electronic decoder may also include electronic recognition to interpret the hidden information, such as bar-codes and digital data.

The exemplary embodiment is a method and apparatus for a digital screen to create an encoded digital screen, in which elements of the screen, such as pixels or dots, are part of the image. In the exemplary embodiment, these pixels or dots may be used as the digital information carriers. By using such digitally encoded screens, it may be possible to produce copy-protected hidden images for security printing, for example, where copying the copy-protected image results in the nonreproduction of the hidden image. This process is not limited to one particular encoded screen to solve particular technological imperfections, but may be used to provide a solution for all of the aforementioned technological problems.

In order to reproduce the primary image only, the elementary digital information carriers (dots, pixels, etc.) may be created and grouped according to the constraints of the actual reproduction technology. In this case, only the primary image is reproduced. By distortion, modification, etc. of these elementary data holders a secondary image can be incorporated into the primary image. In this way, the "noise" of the primary image is increased and the secondary image also appears within the visible form. In order to decrease the "noise" of the primary image again, all modifications and distortions must be compensated for on an element by element basis (dot by dot or pixel by pixel) within a predefined area, which is smaller than the resolution of the human eye. In this way, the secondary image again becomes hidden, and the quality of the primary image is improved.

Figure 7:
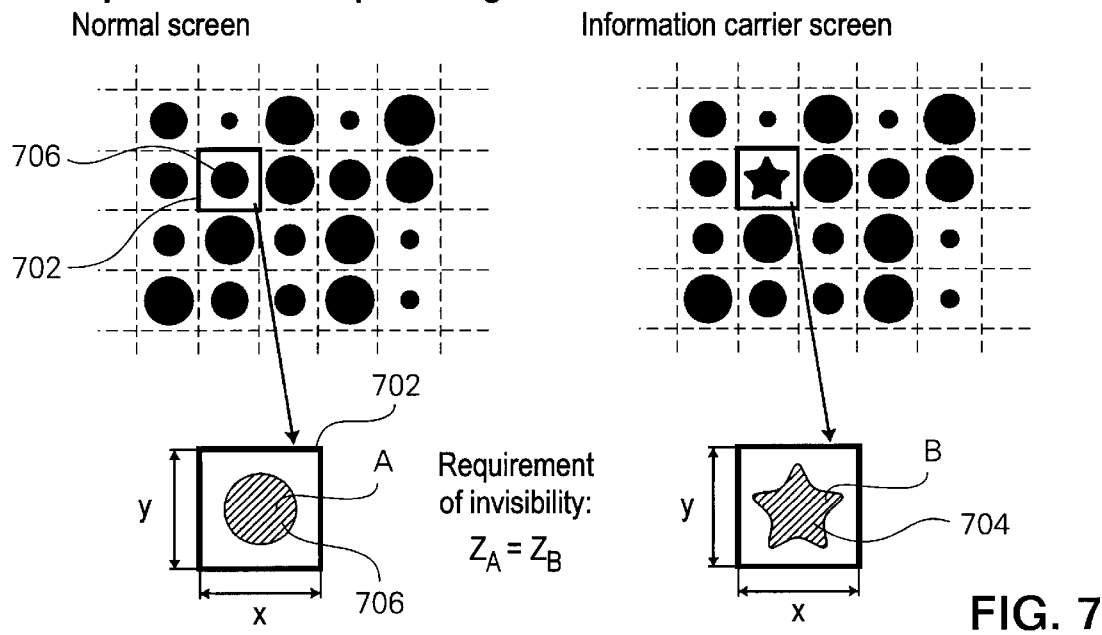
FIGS. 7 and 8 show the way hidden information can be added to an image by modification of a screen dot without modifying either the dot area percentage or the supercell dot area percentage.
Figure 8:
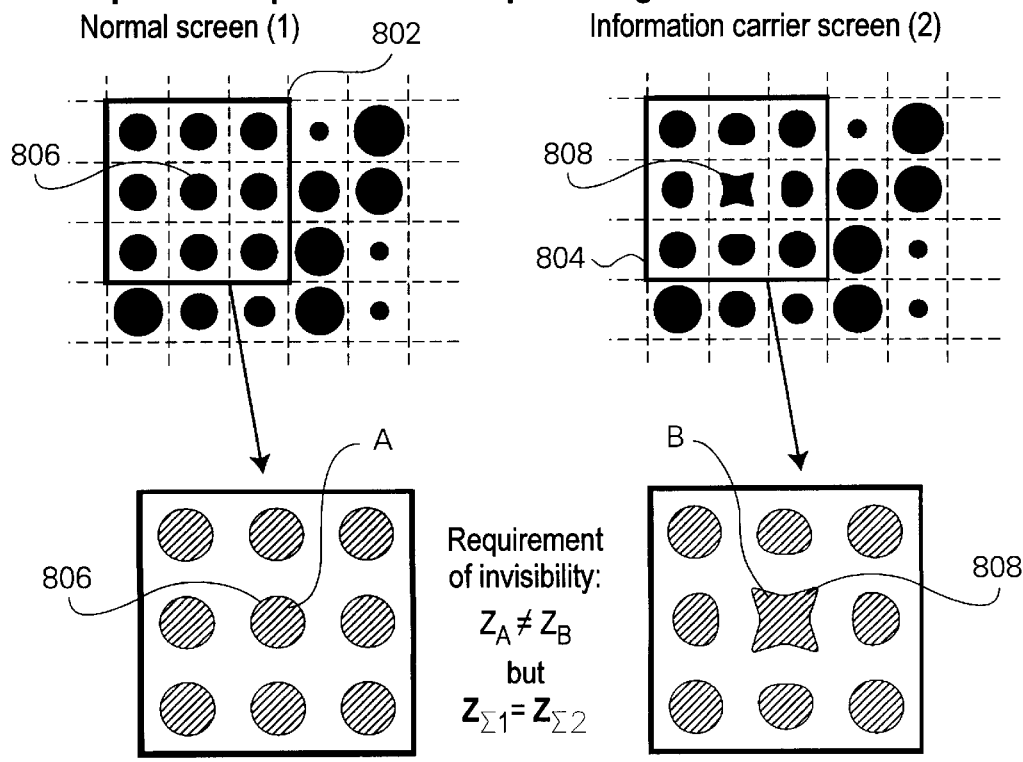
Figure 9:
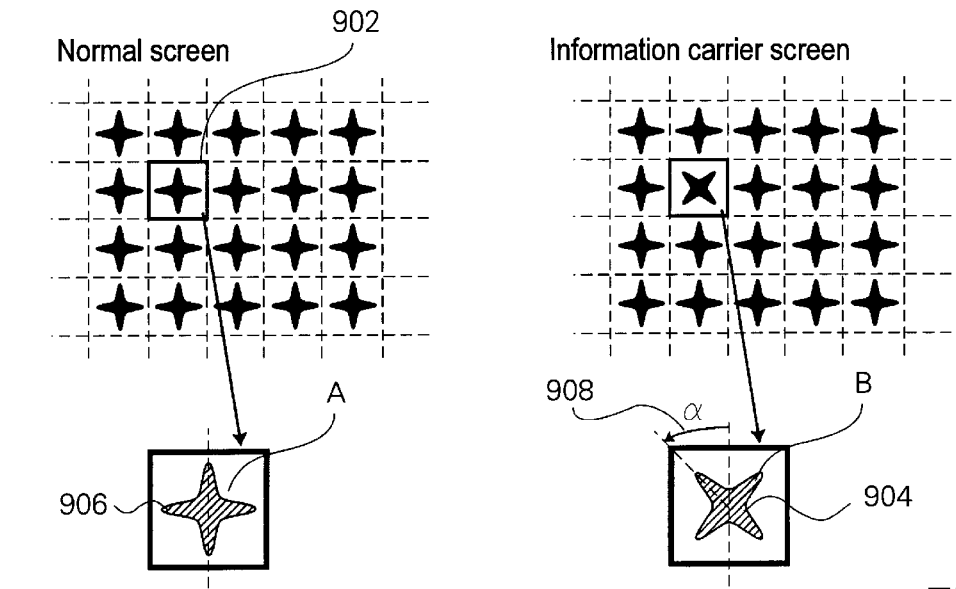
FIG. 9 shows the way hidden information can be added to the image by modification of the angle of the screen dot, without modifying the dot area percentage.
Figure 10:
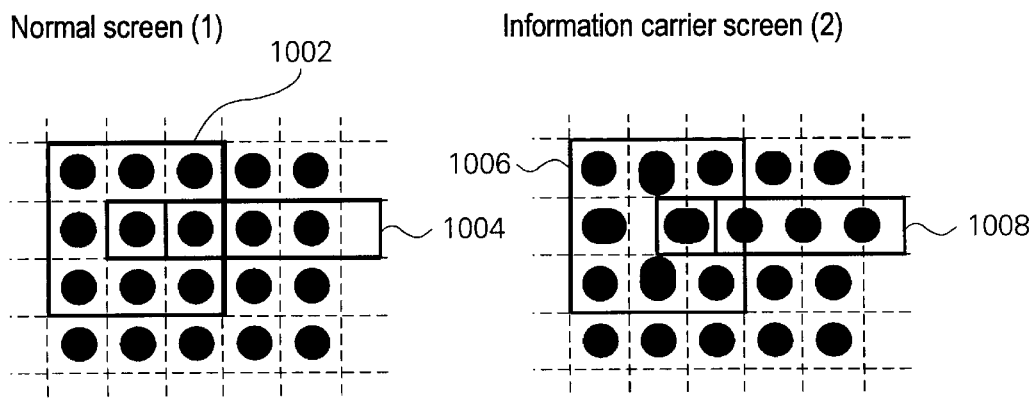
FIG. 10 shows the way hidden information can be added to an image by modification of the position of the screen dot, without modifying the supercell dot area percentage.
Figure 11:
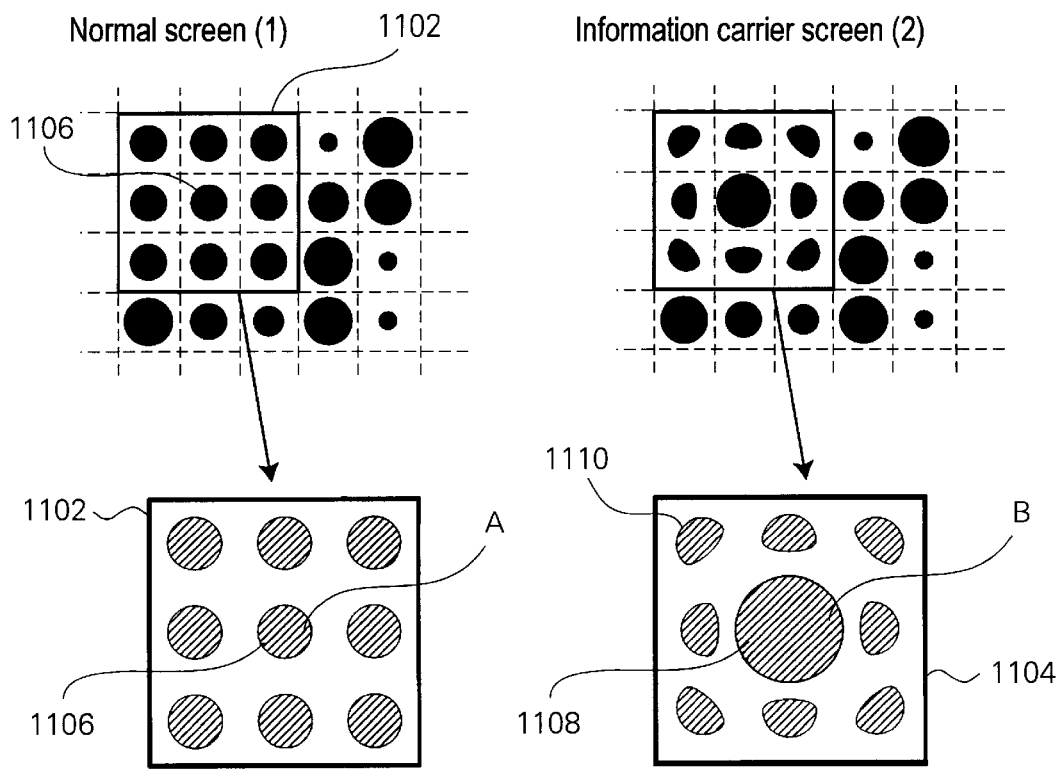
FIG. 11 shows the way hidden information can be added to the image by modification of the size of the screen dot, without modifying the supercell dot area percentage.
Figure 12:
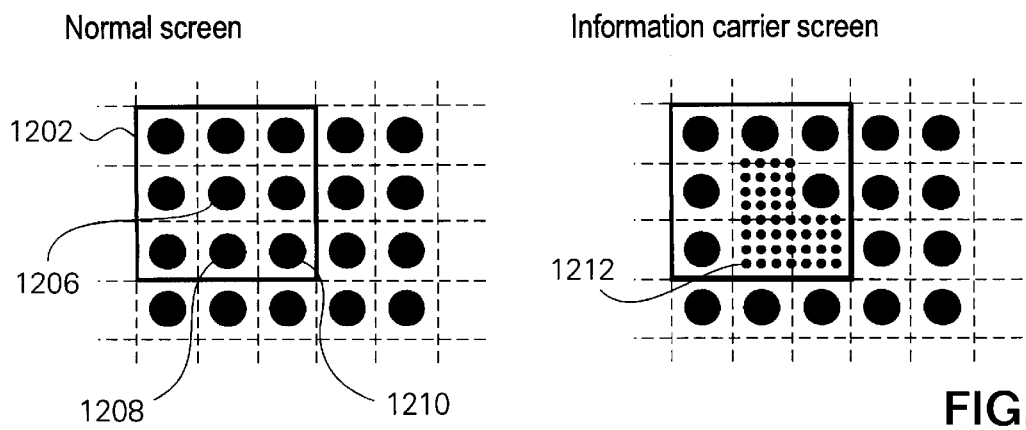
FIG. 12 shows the way hidden information can be added to the image by modification of the frequency of the screen dot, without modifying the supercell dot area percentage.

Using an elementary dot or pixel, for example, as a digital information carrier the following exemplary parameters may serve for modification or distortion of the image:

density (see FIG. 6)

form and shape (see FIGS. 7 and 8)

angle (see FIG. 9)

position (see FIG. 10)

size (see FIG. 11)

frequency (see FIG. 12)

The aforementioned parameters may be used within one or more color layers of the primary image, as well as between color layers of the primary image.

As a result of processing the data by using a Successive Approximation Algorithm, for example, two portions of each individual elementary dot, pixel, etc., are within the area where the secondary image is hidden. These two portions are:

a data-holder portion of the elementary dot, pixel, etc., where the primary image is distorted or modified according to the secondary image, and a compensation portion of the elementary dot, pixel, etc., which compensates for the distortions, modifications of the data-holder portion.

As a result, essentially all of the dots or pixels will be distorted or modified compared to the reproduced primary image only.

Referring to FIG. 6, an example is shown of how information is hidden where the information carrier is based on the density of the information. In FIG. 6, cells 602, 604, 606 are designated as the cells in which information is to be hidden. The density of cells 602, 604 and 606 are varied and result in cells 608, 610 and 612, respectively. In FIG. 6, $D1_1$, $D1_2$, $D1_3$, $D2_1$, $D2_2$, and $D2_3$ are the densities of cells 602, 604, 606, 608, 610, and 612, respectively. The density of the cells should not necessarily be equal ($D1_1 \neq D2_1$, $D1_2 \neq D2_2$, $D1_3 \neq D2_3$). The information is hidden when the average density of supercell 614 and 616 is equalized.

Referring now to FIG. 7, an example of how information is hidden and compensation within a cell is shown based on equalizing the percentage of the cell dot area percentage. In FIG. 7, cell 702 is used as an information carrier cell. Information carrier dot 704 replaces dot 706. Information carrier dot 704 will be hidden when the area of information carrier dot 704 equals the area of dot 706. In other words, when the following equation is satisfied:

$$Z_A = Z_B \qquad \text{Equation (3)}$$

where, $Z_A$ is the dot area percentage of dot 706 and $Z_B$ is the dot area percentage of information carrier dot 704.

Referring now to FIG. 8, an example of how information is hidden and compensation is shown based on equalizing the percentage of the supercell dot area percentage. In FIG. 8, supercell 802 is used as an information carrier supercell. Information 808 replaces dot 806 within supercell 802 to create supercell 804. Information 808 will be hidden when the average dot area percentage of supercell 804 (having elements 810, 812, 814, 816, 818, 820, 822, and 824 in addition to information 808) equals the average dot area percentage of supercell 802. In other words, when the following equation is satisfied:

$$Z_{\Sigma 1} = Z_{\Sigma 2} \text{ and } Z_{\Sigma A} \neq Z_{\Sigma B} \qquad \text{Equation (4)}$$

where, $Z_{\Sigma 1}$ is the average dot area percentage of supercell 802 and $Z_{\Sigma 2}$ is the average dot area percentage of supercell 804.

Referring now to FIG. 9, an example is shown of how information is hidden within a cell where the hidden information carrier is an angle. In FIG. 9, cell 902 is used as an information carrier cell. Information 904 replaces element 906. Information 904 will be hidden when either Eq. (3) or Eq. (4), above, are satisfied. As shown in FIG. 9, information 904 may be rotated through angle α. Angle a may be any angle from 0–359 degrees.

Referring now to FIG. 10, an example is shown of how information is hidden within a cell where the information carrier is position. In FIG. 10, supercells 1002 and dot 1004 are shown in an unaltered screen. The information carrier is the repositioning of dot 1004 into dot 1008. Information may be hidden in the resultant supercell 1006. Information will be hidden when Eq. (4), above, between supercell 1002 and 1006, is satisfied. The position change varies according to the degree of hiding desired.

Referring now to FIG. 11, an example is shown of how information is hidden where the information carrier is based on size of the dot. More specifically, dot 1108 replaces dot 1106. Information will be hidden when the total dot area of supercell 1104 equals the total dot area of supercell 1102 such that Eq. (4) is satisfied.

Referring now to FIG. 12, an example is shown of how information is hidden where the information carrier is based on the frequency of the dot. In FIG. 12, each dot 1206–1210 is replaced with higher frequency screen dots 1212. The invention is not limited to this, however, and a single dot, such as dot 1206, may be replaced by more than one screen dots 1212. Screen dots 1212 will be hidden when either Eq. (3) or (4) are satisfied.

To make the secondary image visible, a physical or electronic decoding process and an adequate device are needed. The decoder preferably selects the "data-holder" portions of the dots, pixels etc., using a statistical sampling method, for example, to activated the decoder and make the hidden indicia visible to the user.

The components of the process may be connected through an appropriate interface and the process optimized in order to reach an appropriate quality of the primary image and reliable readability of the hidden information encoded into the secondary image.

In another exemplary embodiment of the present invention, the process takes into consideration the different components of the reproduction procedure and user defined parameters or priorities, to produce a high quality visible primary image with minimal "noise" and maximum readability of the hidden information encoded into the invisible secondary image.

In a third exemplary embodiment, the hidden image may be based on variable parameters, rather than a fixed parameters. In this exemplary embodiment, the following variable parameters may be considered:

1. the characteristics of the visible primary image, such as single color or multicolor grey scale or spot colors the nature of the primary image, such as background, pattern, picture, text, etc.

2. the characteristics of the hidden secondary image, such as single color or multicolor text, picture, pattern or other optically recognizable image or direct digital data, etc.

3. the characteristics of the reproduction process and adequate screening technology, such as the resolution of the reproduction process the minimal size and shape of the applicable dot or minimal width of the thinnest applicable line the applicable minimum space between the elementary dots or lines the size and shape of the preferable screen relevant to the actual reproduction process (continuous tone, dot, line etc.)

electronic reproduction (for a display) or "hard copy" (for printed media)

traditional printing (offset, intaglio etc.) or digital printing (computer printers, such as laser printers, inkjet printers, dye sublimation printers etc.) or digital printing machines (Xeiko, Indigo etc.)

continuous tone screening, dot screen screening, etc.

4. the characteristics of the decoding device, such as simple optical decoders for reading optical codes made on the principle of a simple optical filter with different geometrical forms using periodical or random filtering patterns.

complex optical decoders for reading optical codes with different optical (magnifier, reverse, prismatic diminishing etc.) effects.

simple electronic decoders for reading optical codes with software simulation of functions of the optical decoders without electronic recognition.

advanced electronic decoders for reading optical codes with software simulation of functions of the optical decoders with electronic recognition.

complex user programmable electronic decoders for reading direct digital codes which are also programmable by the users.

5. the level of security (copy-protection, reproducibility, etc.) , such as the image must be protected against copying the image must be protected against alteration or replacement the encoded data must be protected protection of either the primary image, secondary image or information is preferred over one another.

In a fourth exemplary embodiment, the hidden image may be based on user defined parameters or priorities. In this exemplary embodiment, the user selected parameters may include:

the quality of the primary image the sharpness and readability of the secondary image the nature of secondary image (such as, alphanumeric, picture, binary code, etc.)

the process of decoding (physical, electronic, software, etc.)

the actual reproduction technology used (such as, electronic, digital printing, traditional printing, etc.)

security (such as, data protection and protection against reproduction)

Figure 18:
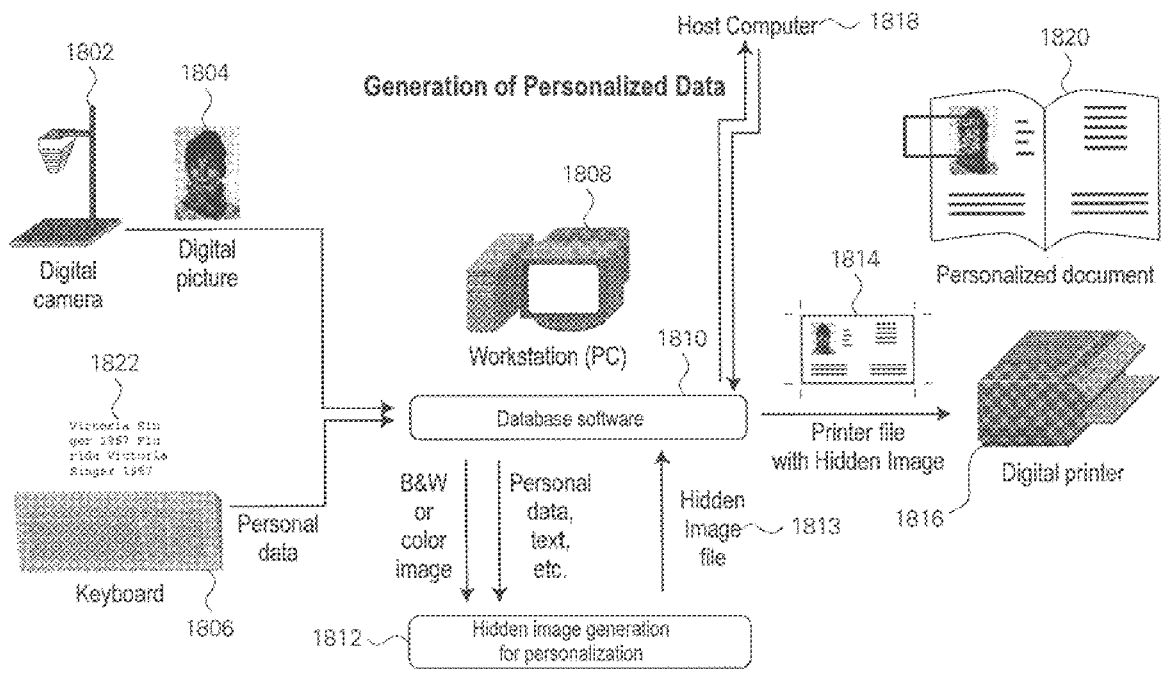
FIG. 18 is a second exemplary hardware configuration of the present invention.

Referring to FIG. 18, an exemplary embodiment of a document personalization system of the present invention is shown. In FIG. 18, digital camera 1802 is used to photograph a primary image (not shown) to create a digital representation of that image 1804. Input device 1806, such as a keyboard, may be used to input personal data 1822 for incorporation into the primary image. The image 1804 and personal data 1822 are provided to workstation 1808 which contains database software 1810. The personal data 1822 and image 1804 are processed by encoder 1812 to create a hidden image file 1813. Hidden image file 1813 is then provided to software 1810 which operates on the image 1804 and hides a data 1822 within image 1804 to create a unified file 1814. The unified file 1814 is output to printer 1816. Printer 1816 then prints personalized document 1820 based on unified file 1820. Workstation 1808 may be connected to a host computer 1818 if necessary to control and/or supply additional data to workstation 1808. This exemplary embodiment is useful where very high resolution is not a requirement. The format of the above mentioned files may be in a "DLL" format for ease of use with PC based systems, although any file format may be used depending on the target system and/or user requirements.

Figure 17:
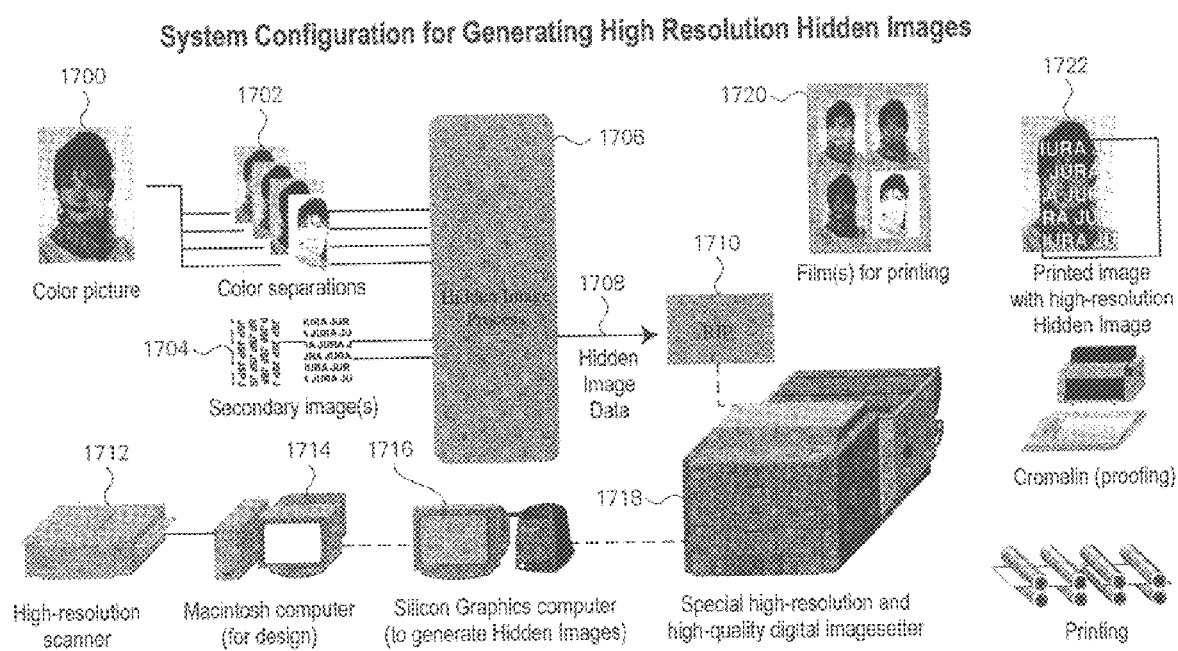
FIG. 17 is a first exemplary hardware configuration of the present invention.

An exemplary embodiment of the present invention for generating high resolution images is shown in FIG. 17. In FIG. 17, Various image files (not shown) are provided to a SILICON GRAPHICS INC. (SGI) workstation 1716 which executed software which generates the hidden elements. While the software might run on any computer capable of handling high resolution graphics, the SGI machine is used because of its superior speed and graphical abilities. Scanner 1712 is used to scan the primary image 1700. The scanned information is provided to computer 1714. In the exemplary embodiment, computer 1714 is a MacIntosh computer and is used for implementing the design program, although any computer with similar capabilities may be used. The files are opened by the software and the hidden indicia types, values, and parameters are selected by the user. Encoding algorithms are applied by the software to merge secondary images from SGI 1716 with visible images from computer 1714, to create a new merged file 1708 using hidden image process 1706. The new merged file may be in a "DLL" file format, for example, although any file format may be used depending on the target system. The completed design is then provided to an output device 1718 which is capable of printing the final image with the resolution necessary to maintain and reveal the hidden secondary images upon decoding. A preferred output device is manufactured by SCITEX DOLEV, although any high-quality high-resolution image-setter may be used. Optionally, proofing apparatus 1724 may be used to proof the final product 1722 to ensure compliance with the user selected preferences.

As the exemplary process is a compensation based process, the user may hide more that one secondary image within a single primary image. Accordingly, the process would allow the user to indicate the appropriate primary files on which to perform the process and indicate one, two, or more secondary files to hide within the image represented by the primary file. Other operations which could be selected for calculation, would include a "tint" method, a "scramble" method, a "multilevel" method, and a "raster" method. Otherwise, the user might choose to exit the program, or re-enter the selection process.

Upon transitioning past the selection process, the process checks the various input settings selected the user. The process detects errors relating to each selection, and displays an appropriate error message. Based upon the input settings selected, the various operations will be performed, e.g. hide one secondary image and save the results to an output file; hide two secondary images and save the results to an output file; hide more than two secondary images and save the results to an output file; hide with a tint method and save the tint method results to an output file; hide with a scrambled method and save the scrambled/hidden results to an output file; hide with a multilevel method and save the multilevel results to an output file; or hide with a raster method and save the raster results into an output file. The results of any of these methods can then be displayed and viewed (if desired) via a resulting viewer window (not shown). Tonal sound indicators (not shown) can also indicate the progress of the software if selected.

The primary image may be a gray scale image which may include one or more secondary images as hidden images. The gray scale image may be reduced to its color components into which one or more secondary images may be hidden in any or all of the color components. The primary image may also be a color image in which one or more secondary images are hidden. When hiding more than one secondary image in a primary image, each secondary image may be rotated with respect to one another, such as at angle of between 0–359 degrees, for example. Rotation of secondary images is applicable in both gray scale and color primary images and may be within a single color component layer or between color component layers.

The associated software program uses a variety of user interface screens which facilitates choosing which type of process will be performed, and under which parametric conditions. Various screens, typical of "window" type environments are presented to the user to facilitate user selections of the various criteria outlined above. The environment is similar to conventional Graphical User Interfaces (GUI) which use a variety of user input and selection devices and, as such, a detailed explanation is not provided.

Typical user interface screens may provide, for example, File Menu options (e.g. About, Load Settings, Save Settings, Sound, and Quit), Directory options, File retrieve options, File store options, File Type options, Sound options, Filter options, etc. Further screens within the program hierarchy may provide, for example, Decoder options, Phase options (one phase, two phase, etc.), Density options (light to dark or positive to negative). Variable options may be provided via a conventional slider type bar or a digital representation of an analog control, such a knob.

Both the primary file and destination file boxes have conventional "browse" capability to facilitate ease of use so that the user need not remember in which location or directory a particular file is located within the system or network.

The "filter" options allow the user to select a specific file name and have the program search for it. The "resolution" option allows the user to select the desired resolution of the final output image. Preferably, this number is matched to the resolution of the destination printing device. Conventional compression techniques may also be used during file save operations to keep the overall size of the files smaller and conserve disk storage space.

Similar user screens are provided when a two or three secondary image operation is desired. However, these screens provide addition selections for additional secondary images to be interlaced into a multi-phased secondary image. In a multi-phased process, the user may also select different rasterization densities for each secondary image. This is especially useful when the user wants to create an overlay different sets of text that will be viewed together, yet be seen as separate words when decoded.

Additional user interface screens are provided for performing an "indicia tint" operation. Unlike the hidden image, the indicia tint will flow as smoothly as possible through the image, ignoring tonal variations.

One of the most useful applications for the above described process is where the primary image is a photograph and the secondary image is a signature of that subject of the photograph, for example. Using this process, the primary image may be rasterized and then the signature can be merged into the elemental pattern of the primary image raster. The resulting encoded image will be a visible image of a person's photograph, which when decoded will reveal that person's signature. The secondary image might also include other vital statistics such as height, weight, etc. This high security encoded image would prove to be extremely useful on such items as passports, licenses, photo ID's, etc. (See FIG. 18)

The security of the hidden Indicia might be further enhanced by making 3 color separations in Cyan, Magenta, and Yellow of the image after the hidden image process has been performed. These colors would then be adjusted to each other so that at natural gray could be obtained on the printed sheet when the colors are recombined. Hence, while the printed image would appear gray to the unaided eye, the decoded image would appear in color. The adjustment of the separations to maintain a neutral gray becomes yet another factor to be controlled when using different combinations of ink, paper, and press. Maintaining these combinations adds another level of security to valuable document currency.

Figure 13:
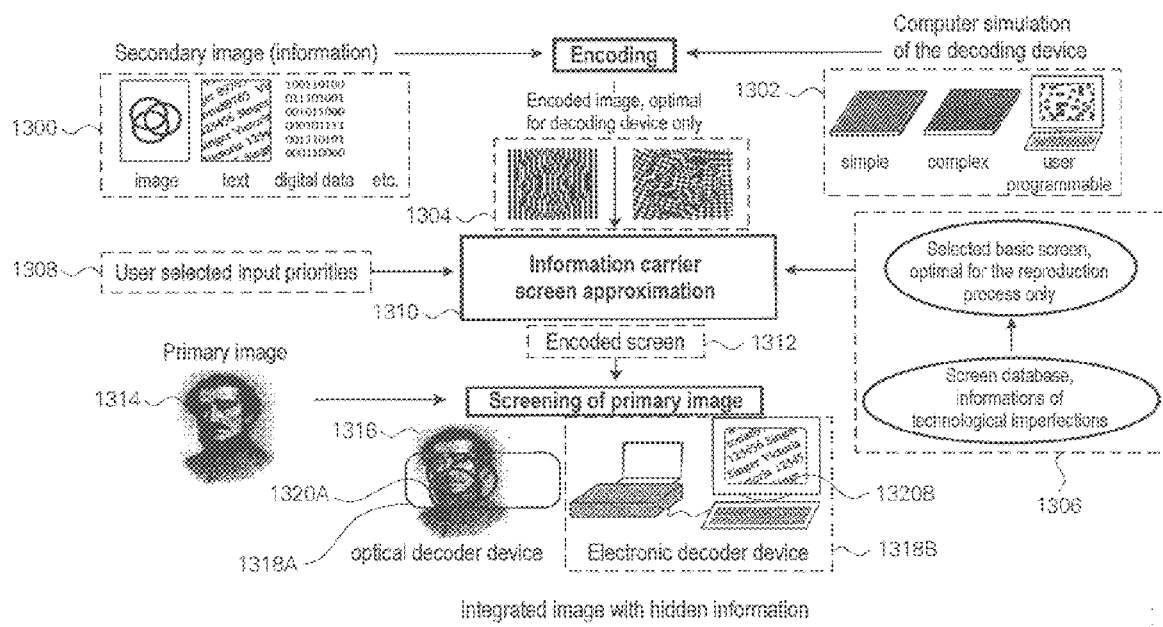
FIGS. 13, 14A and 14B are flow charts of processes for generating images containing hidden information;.
Figure 14A:
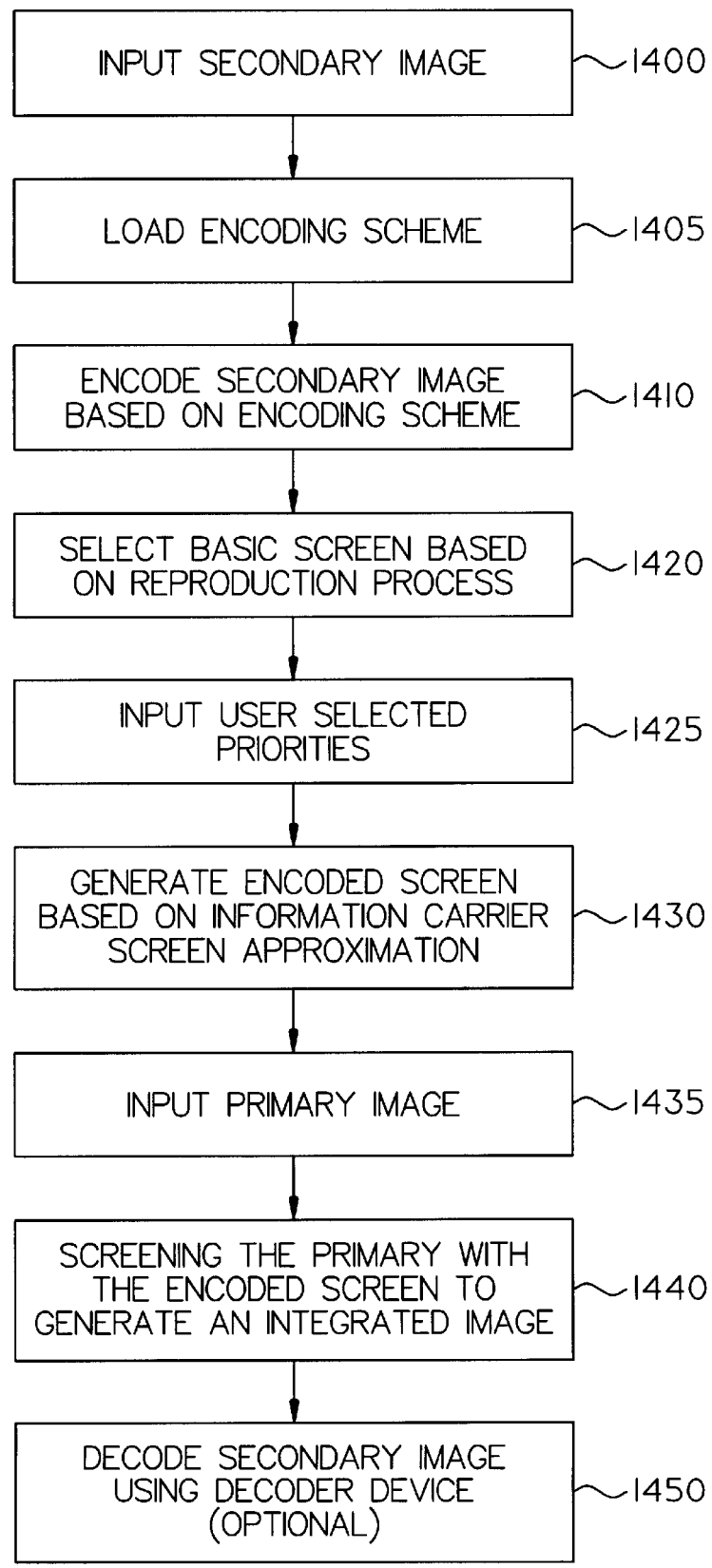

Referring now to FIGS. 13 and 14A, flow charts of an exemplary embodiment of the present invention is shown.

Referring to FIGS. 13 and 14A, at Step 1400, secondary image 1300 (consisting of one or more images, text, data, etc.) is input. At Step 1405, a preselected or user defmed encoding scheme 1302 is loaded. At Step 1410, secondary image 1300 is encoded based on encoding scheme 1302 to generate encoded image 1304. At Step 1420, a basic screen (not shown) is selected based on a desired reproduction process including attendant technological imperfections of that process. The basic screen is preferably selected from a data base 1306 and optimized based on the desired reproduction process. At Step 1425, user selected priorities 1308 are input for consideration in the hidden indicia process. At Step 1430, the encoded screen 1312 is generated based on the an approximation of the information carriers 1310 contained within the encoded secondary image. At Step 1435, primary image 1314 is input. At Step 1440, primary image 1314 is screened using the encoded screen 1312 to generate integrated image 1316. At Step 1450, integrated image 1316 may optionally be decoded with decoder 1318A, 1318B to reveal secondary image 1320A, 1320B (identical to image 1300).

Figure 14B:
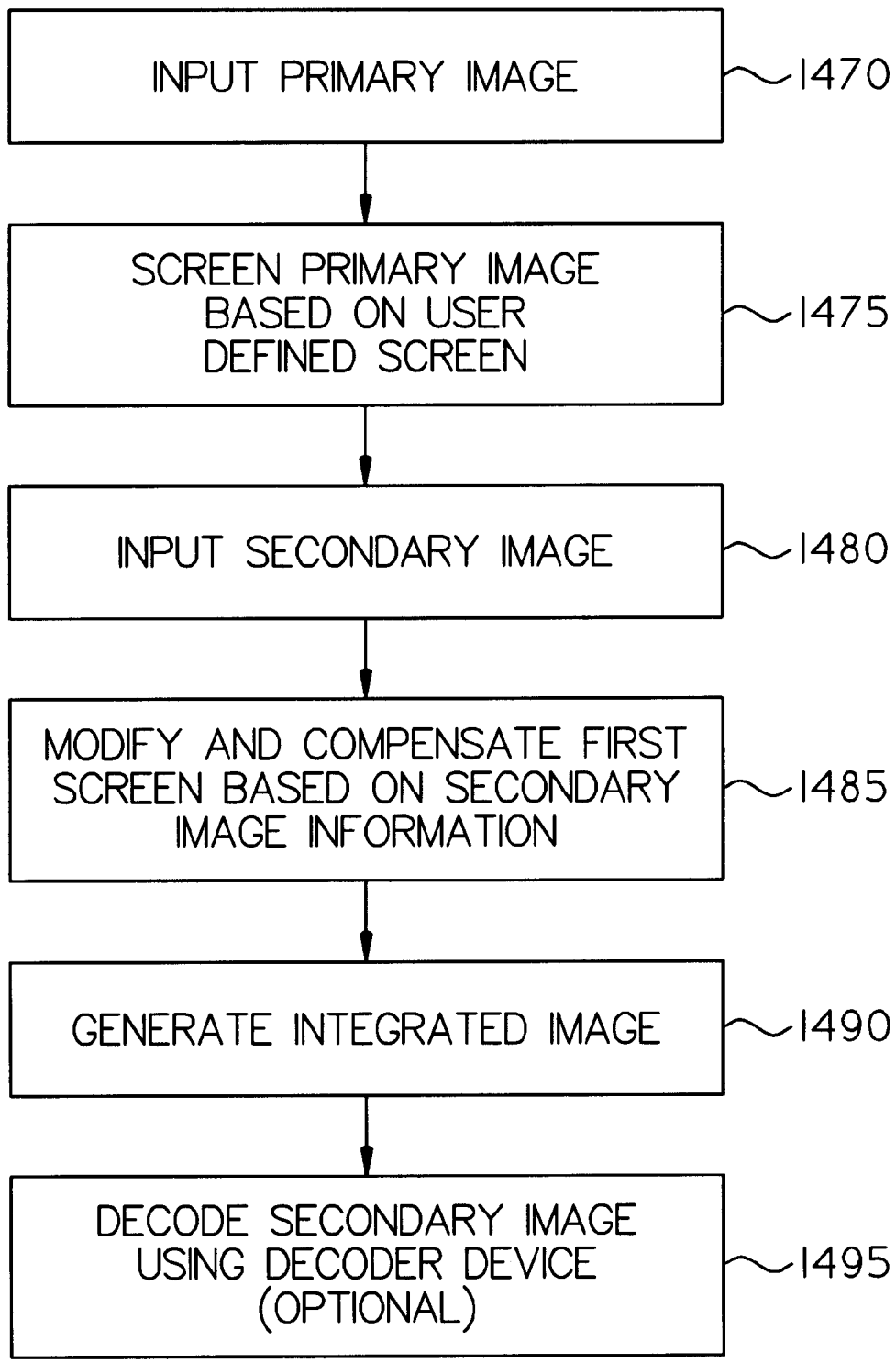

Another exemplary embodiment of the present invention is shown in FIG. 14B. In FIG. 14B, at Step 1470, primary image 1314 is input. At Step 1475, primary image 1314 is screened based on a user defined screen. At Step, 1480 secondary image 1300 is input. At Step, 1485, the first screen is modified and compensated for based on secondary image information.image 1316 is generated. At image 1316 is generated. At Step 1495, integrated image 1316 may optionally be decoded with decoder 1318A, 1318B to reveal secondary image 1320A, 1320B (identical to image 1300).

Figure 15:
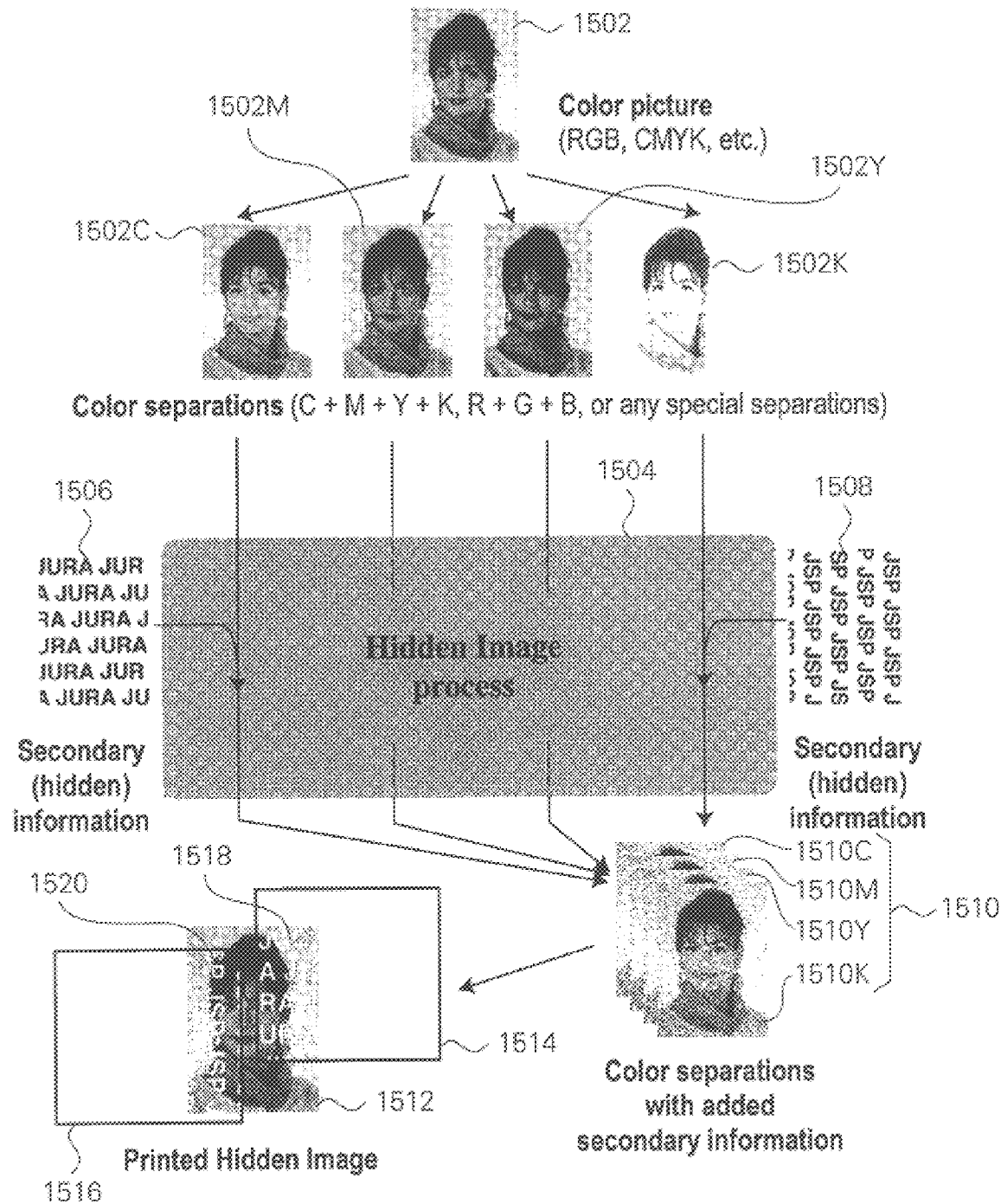
FIG. 15 is an example of hiding information within a separated color layer of a primary image.

Referring now to FIG. 15, an example of hidden image generation in color separation is shown. In this example, a photograph 1502 is reproduced whereby the process incorporates two different secondary images 1506 and 1508 , oriented 90 degrees to each other, into two different base colors of the visible primary image. The visible primary image 1502—as comprised of its original RGB colors—is scanned, as a digital high resolution image, using any type of photoretouching software. The image is then divided into its component color "plates" in yet another commonly used color format CMYK, wherein the component images of Cyan 1502C, Magenta 1502M, Yellow 1502Y, and Black 1502K, are shown. The versatility of the process allows for the easy combination of a secondary image with any one component color of the visible image. In this case, the secondary invisible image 1506 with the repeated symbol JURA, for example, is merged with the Cyan color plate 1502C. The resulting Cyan color plate 1510C—as described above—will show the original visible image in a rasterized pattern to the unaided eye, but the secondary invisible image will be encoded into the rasterized pattern. A second secondary invisible image 1508 with the repeated mark JSP, for example, is merged with the Magenta color plate 1502M to produce the encoded Magenta image 1510M. The final visible image 1512 (similar to 1502) will then be re-composed using the original Yellow 1502Y and Black 1502K plates along with the encoded Cyan 1510C and Magenta 1510M plates. Secondary information 1506 may be read as information 1518 from printed image 1512 using decoder 1514. Secondary information 1504 may be read as information 1520 from printed image 1512 using decoder 1516.

Figure 16:
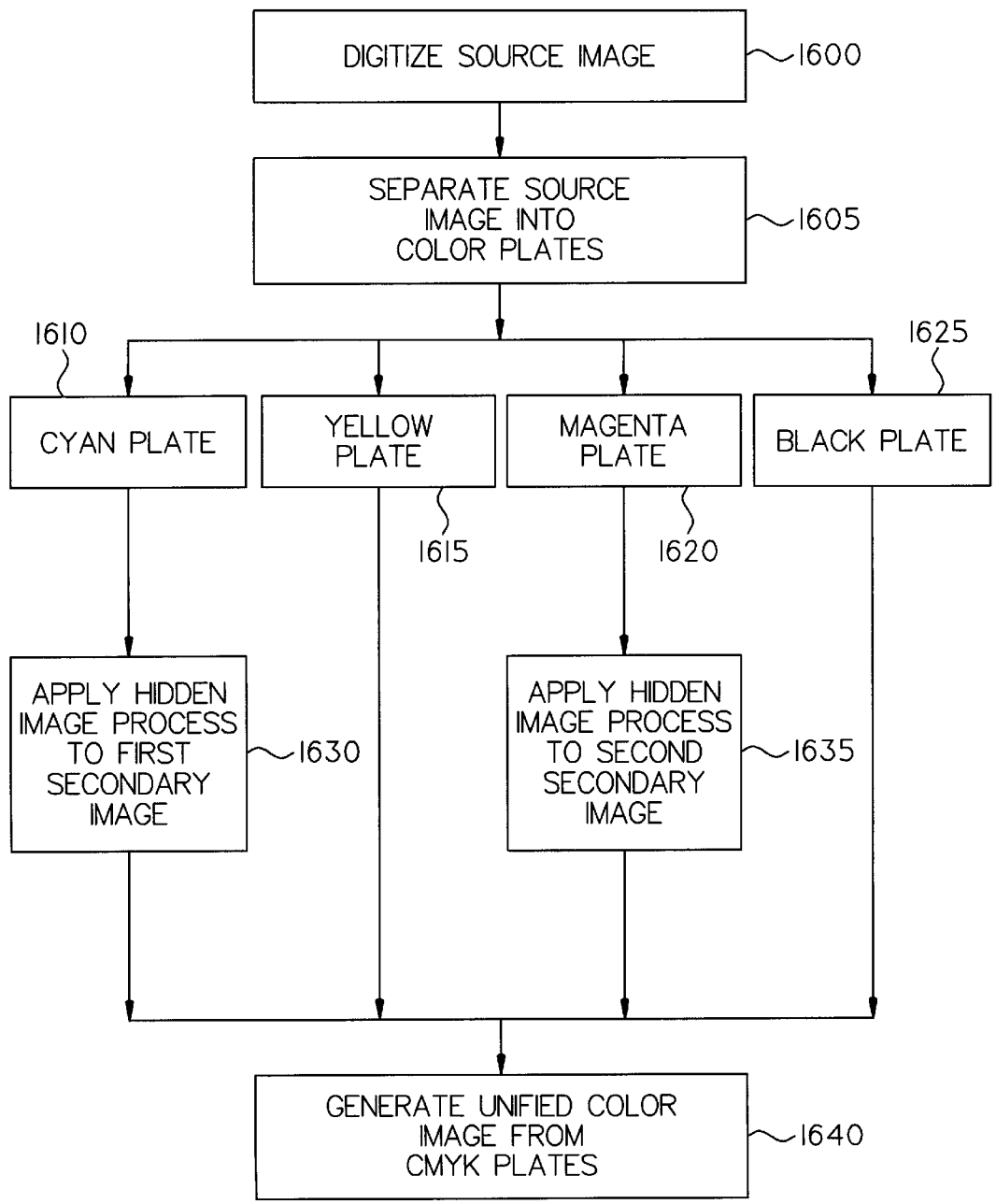
FIG. 16 is a flow chart describing the process to create the image of FIG. 15.

Referring now to FIG. 16, an example flow chart of the steps performed by the software in FIG. 15 is shown. The primary image 1502 is first digitized at Step 1600 and then divided out into its component CMYK colors 1502C, 1502M, 1502Y and 1502K at Step 1605. Each color plate can be independently operated on by any of the processes implemented at Steps 1610, 1615, 1620, and 1625, respectively. In this case, a hidden image technique (or rasterization in single color) is performed. Next, the hidden image process is applied to the first secondary image 1506 at Step 1630 and the second secondary image 1508 at Step 1635. The final output image 1512 is created by re-joining the encoded Cyan and Magenta color plates with the unaltered Yellow and Black color plates 1510 at Step 1640. In this example, only the Cyan and Magenta colors were encoded. Other examples might choose to encode one color, three colors, or all four colors.

Still another possible use of the program would be to create interference, or void tint, combinations on printed matter. This technique will conceal certain words, like "void" or "invalid" on items such as concert tickets. If the ticket is photocopied, the underlying word "void" will appear on the copy and hence render it invalid to a ticket inspector. The software would provide an efficient and low cost alternative to producing such void tint patterns.

The exemplary process of the present invention may also be adapted to produce watermark-type patterns which are typically introduced to paper via penetrating oil or varnish. Furthermore, the process may be applicable to producing holograms via line diffraction methods, for example. Again, the program would prove to be more efficient and cost effective for producing such results.

Other useful application may include encoding of a secondary image hidden and divided in three or more different color-separations requiring extremely high accuracy in registration. Upon rejoining the colors in printing the secondary image will be readable by decoding device. Should the registration performed below the required accuracy both primary and secondary images would be damaged efficiently.

Still other useful application might include generation and optimization of digital screens consisting of user definable elementary dots for example: letters, patterns, drawings or whatsoever, although user definable screens might be applicable as high value security features in one or multicolor process even without hiding a secondary image into the primary image, an enhancement of feature might be the hiding of the secondary image.

Figure 19A:
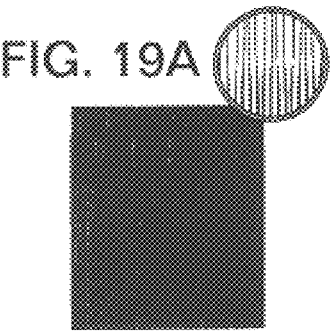
FIGS. 19A–19J show various techniques for activating a decoder of the present invention.
Figure 19B:
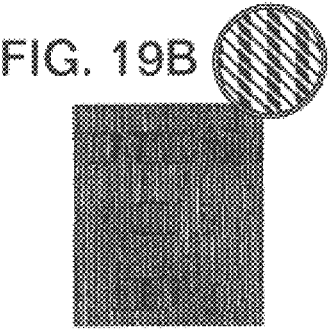
Figure 19C:
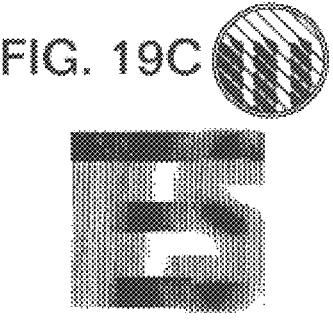
Figure 19D:
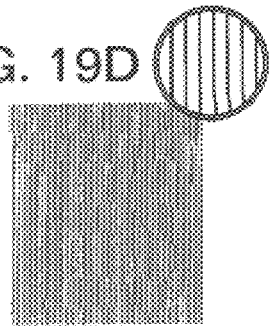
Figure 19E:
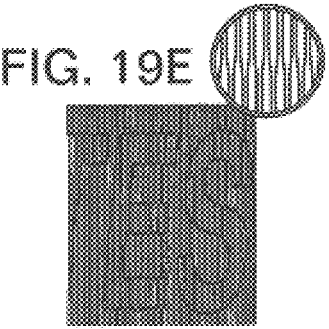
Figure 19F:
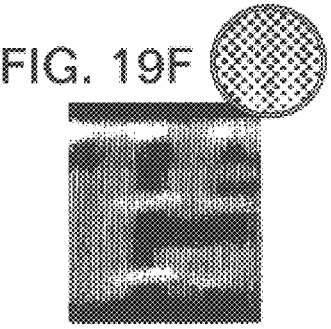
Figure 19G:
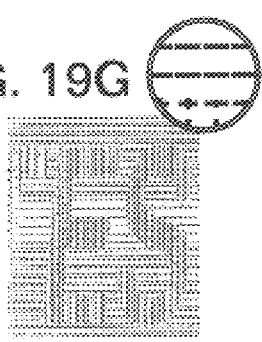
Figure 19H:
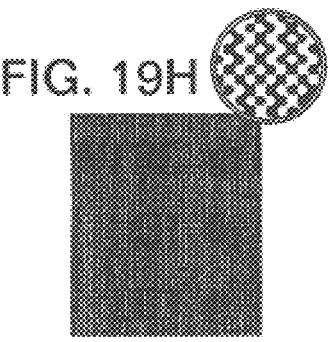
Figure 19I:
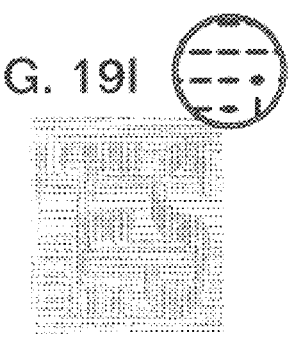
Figure 19J:
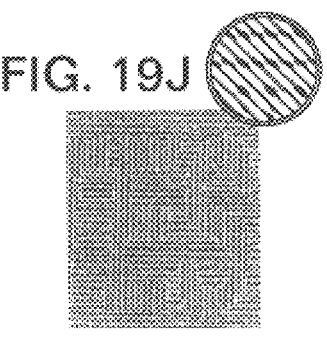

Referring now to FIGS. 19A–19J, various techniques for activating the decoder are shown which may be used to encode images into visible primary images. Accompanying each Figure is a circle showing an enlarged portion of the image. The example types include: FIG. 19A, double line thickness modulation; FIG. 19B, line thickness modulation II; FIG. 19C, emboss line rasterizing; FIG. 19D, relief; FIG. 19E, double relief; FIG. 19F, emboss round raster; FIG. 19G, cross raster; FIG. 19H, latent round raster; FIG. 19I, oval raster; and FIG. 19J, cross line raster. Another technique, cross embossed rasterizing, may use one frequency of lens density on the vertical plane and yet another frequency on the horizontal plane. The user would then check each secondary image by rotating the lens. Yet another technique may include lenses which varying in frequency and/or refractive characteristics across the face of a single lens. Hence different parts of the printed matter may be encoded at different frequencies and still be decoded by a single lens for convenience. Undoubtedly many other rasterizing types exist which are easily adaptable to the encoding techniques.

Regardless of the type of rasterizing used, a variety of other security measures may be performed using the program and the underlying principles involved. For instance, the consecutive numbering system found on tickets or money might be hidden to insure further security against copying. The program might also digitally generate hidden bar encoding.

Yet another common security printing technique includes using complex printed lines, borders, guilloches, and/or buttons which are difficult to forge or electronically reproduce. The program can introduce patterns which follow certain lines on the printed matter.

Referring now to FIG. 20, one scrambled image is processed into a visible image. This process is generally referred to as a "one phase" encoding operation. In any encoding operation, an output image is a function of the decoder lens density. An output image 2 is shown which is sliced up into elemental slices 4, or segments, of width h. Each slice width h is a function of several factors such as density and base code. FIG. 21 illustrates a scrambled image where segments 2100 of the image are flipped with respect to one another and result in flipped segment 10.

Referring now to FIG. 21, certain details of an exemplary scrambling-process of the prior art are shown. In this example, this process is generally referred to as a "one phase" encoding operation which is sliced up into elemental slices, 10 or segments of width h4. An elementary slice is shown in FIG. 21.

Each slice width h is a function of several factors such as density, overlapping, mirroring, doubling, zooming and base code 8.

Referring now to FIG. 22, a "two phase" scrambled encoding process is shown whereby the method is similar to that for the one phase process. In this case, however, each slice of width h is further divided into a first 2200 sub-slice and second sub-slice 2202. The elemental lines of first and second secondary images will be stored by the software program in 'primary one' and 'primary two' files. In the resulting output image, the odd slices 14 are composed of elemental lines from the primary one file, and the even slices 16 are from the primary two file. Upon decoding, the first and second secondary images will appear independently discernible.

Referring now to FIG. 23, a "three phase" scrambled encoding process is shown as similar to the one and two phase encoding processes. In this case, width h is divided into three parts. The first, second, and third secondary images are stored in three computer primary files. In the resulting output image, every third slice 2300, 2302, and 2304 comes from the same respective first, second, or third primary file. Again upon decoding, the first, second, and third secondary images will appear independently discernible. Slices 2300, 2302, 2304 may also be rotated, relative to one another through a series of angles ranging from—1–359 degrees, for example.

Referring now to FIG. 24, another useful application of this invention to apply the hidden feature to the prior art scrambling process. Certain details of an exemplary combined scrambling and hidden process, where the hidden part compensates the otherwise naturally visible noise of the scrambled process by hiding the scrambled slice elements (under the resolution of the unaided eye) with its complement in a high accurate digital process.

Referring now to FIG. 25, an example of the hidden scrambled process is shown. In this example, a postage stamp is created whereby the process incorporates two different secondary images, oriented 90 degrees to each other, into two different base colors of the visible primary image. The visible primary image—as comprised of its original RGB colors—is scanned, as a digital high resolution image, into a program such as ADOBE PHOTOSHOP. The image is then divided into its component images of Cyan 2502, Magenta 2504, Yellow 2506, and Black 2508 are shown. The versatility of the process allows for the easy combination of a secondary image 2510 with any one component color of the visible image. In this case, the secondary invisible image 2510 with the repeated symbol USPS, for example, is merged with the Cyan color plate 2502. The resulting Cyan color plate 2512—as described above—will show the original visible image in a rasterized pattern to the unaided eye, but the secondary invisible image will be encoded into the rasterized pattern. A second secondary invisible image 2516 with the repeated mark HIDDEN INDICIA is merged with the Magenta color plate 2504 to produce the encoded Magenta image 2518. The final visible image (similar to 2500) will then be recomposed using the original Yellow 2506 and Black 2508 plates along with the encoded Cyan and Magenta plates.

Although the invention is illustrated and described herein, the invention is not intended to be limited to the details shown. Rather, various modifications may be made in the details within the scope and range of equivalents of the claims and without departing from the invention.

What is claimed:

1. A method as implemented on a computer system for digitally producing encoded screens for incorporating secondary information composed of pixels as an anti-counterfeiting security feature into a visible primary image for use on a document, the method comprising the steps of:
    (a) providing a user selected basic screen;
    (b) creating an encoded screen from the user selected basic screen and the secondary information by:
        (1) using the pixels as digital information carriers,
        (2) modifying a parameter of the digital information carriers, and
        (3) placing the modified parameter of the digital information carriers within a plurality of color layers of the primary image based on the secondary information,
    (c) generating a compensated screen containing the secondary information hidden within by compensating the encoded screen for any distortions;
    (d) screening the primary image with the compensated screen to produce a combined output image in accordance with a reproduction technology corresponding to the user selected encoding principle; and
    (e) reproducing the document using the reproduction technology, the document incorporating the combined output image.

2. The method of claim 1, wherein the encoded screen is optimally encoded based on a characteristic of a user selected en coding principle.

3. The method of claim 1, further comprising the step of selecting the basic screen according to the reproduction technology used to reproduce the combined output image.

4. The method of claim 1, wherein the step (b) is based on a successive approximation wherein the successive approximation is implemented in a software module executed in a general purpose computer.

5. The method of claim 4, wherein the successive approximation is based upon at least one of a plurality of user defined parameters of the reproduction technology used to reproduce the combined output image.

6. The method of claim 1, wherein said reproducing step is at least one of:
    i) printing on a medium,
    ii) displaying on a display device, and
    iii) storing on a storage medium.

7. The method of claim 1, further comprising the step of reading the secondary information through a decoding device corresponding to the encoding principle.

8. The method of claim 7, wherein the decoding device is at least one of an optical decoder and a user programmable digital decoder.

9. The method of claim 1, wherein the modified parameter of the digital information carriers is based on at least one of:
    i) a shape of the pixels,
    ii) a size of the pixels,
    iii) an angle of the pixels,
    iv) a position of the pixels,
    v) a frequency of the pixels, and
    vi) a density of the pixels.

10. The method of claim 1, wherein the secondary information is at least one of the group consisting of an image, data, printed matter, and bar code.

11. The method of claim 1, wherein the user selected basic screen is one of:
    i) a round screen,
    ii) a line screen,
    iii) an elliptical screen,
    iv) a rotogravure screen,
    v) a stochastic screen,
    vi) a geometric screen,
    vii) a continuous tone screen, and
    viii) a programmable screen.

12. The method of claim 1, wherein the encoding principle of step (b) is based on a software implementation of a decoding device.

13. The method of claim 1, further comprising the step of optically decoding the combined output image using an optical decoder having an optical filter with at least one of a plurality of geometrical forms.

14. The method of claim 1, further comprising the step of optically decoding the combined output image using an optical decoder having at least one of periodic and random filtering patterns.

15. The method of claim 1, further comprising the step of decoding the combined output image using a complex optical decoder having different optical properties for reading optical codes.

16. The method of claim 15, wherein the different optical properties include at least one of:
    i) magnifying,
    ii) reversing,
    iii) prismatic, and
    iv) reducing.

17. The method of claim 1, further comprising the step of electronically decoding the combined output image using an electronic decoder for reading optical codes using a software simulation of at least one function of an optical decoder.

18. The method of claim 1, further comprising the step of electronically decoding the combined output image using an electronic decoder having electronic recognition for reading optical codes.

19. The method of claim 1, wherein the secondary information includes digital codes and, further comprising the step of:

reading the digital codes embedded within the combined output image using a programmable electronic decoder.

20. The method of claim 4, further comprising the step of calculating a high accuracy registration between various color layers of the combined output image for use in a banknote printing apparatus.

21. The method of claim 1, wherein the document is at least one of:

a check, currency, a ticket, a banknote, a credit card, a passport, a photo-identification card, a special event ticket, a stock certificate, a bond certificate, a bank check, a travelers check, an anti-counterfeiting label, a tax stamp, a postage stamp, a birth certificate, a vehicle registration card, a deed, a certificate of title, and a visa.

22. The method according to claim 1, wherein the visible primary image is a photograph of a person and the secondary information is at least a personal data of the person.

23. The method according to claim 22, wherein the personal data is at least one of i) a height, ii) a weight, iii) an identification number, iv) a signature, v) a blood type, and vi) medical information.

* * * * *

UNITED STATES PATENT AND TRADE MARK OFFICE
CERTIFICATE OF CORRECTION

PATENT NO. : 6,104,812
DATED : August 15, 2000
INVENTORS : Koltai et al.

It is certified that error appears in the above-identified patent and that said Letters Patent is hereby corrected as shown below:

On the cover page, item [56] References Cited, Foreign Patent Documents, delete "0 766 468 4/1997 WIPO" and insert --0 766 468 4/1997 EPO--.

Signed and Sealed this

Eighth Day of May, 2001

*Attest:*

NICHOLAS P. GODICI

*Attesting Officer*   *Acting Director of the United States Patent and Trademark Office*